US007609496B2

(12) United States Patent
Motonobu et al.

(10) Patent No.: US 7,609,496 B2
(45) Date of Patent: Oct. 27, 2009

(54) NON-FEEDBACK TYPE LOAD CURRENT CONTROLLER

(75) Inventors: Masao Motonobu, Tokyo (JP); Shuuiti Matsumoto, Tokyo (JP); Osamu Nishizawa, Tokyo (JP); Tetsushi Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 408 days.

(21) Appl. No.: 11/355,176

(22) Filed: Feb. 16, 2006

(65) Prior Publication Data
US 2007/0030068 A1    Feb. 8, 2007

(30) Foreign Application Priority Data
Aug. 8, 2005    (JP)    ............................ P2005-229461

(51) Int. Cl.
H02H 3/08    (2006.01)
H02H 9/02    (2006.01)
(52) U.S. Cl. .......................... 361/93.1; 361/103; 703/5; 702/132
(58) Field of Classification Search ................. 361/103, 361/93.1; 702/132; 703/5
See application file for complete search history.

(56) References Cited

U.S. PATENT DOCUMENTS

| 4,742,476 A * | 5/1988 | Schwartz et al. ............... 701/30 |
| 5,083,273 A * | 1/1992 | Nishiwaki et al. ............. 701/68 |
| 5,645,352 A * | 7/1997 | Menten ....................... 374/183 |
| 5,818,178 A * | 10/1998 | Marumoto et al. ..... 318/400.32 |
| 5,941,216 A * | 8/1999 | Arakawa ..................... 123/490 |
| 6,351,718 B1 * | 2/2002 | Shimazu et al. ............. 702/107 |
| 6,401,976 B1 * | 6/2002 | Estelle et al. ................. 222/52 |
| 6,671,158 B1 * | 12/2003 | Underwood ................. 361/153 |
| 6,708,089 B2 * | 3/2004 | Hashimoto et al. ............. 701/1 |
| 6,735,557 B1 * | 5/2004 | Castellar et al. ................. 703/5 |
| 2006/0229788 A1 * | 10/2006 | Miyake et al. ................. 701/51 |

FOREIGN PATENT DOCUMENTS

| JP | 05-217737 A | 8/1993 |
| JP | 8-148333 A | 6/1996 |
| JP | 8-293414 A | 11/1996 |
| JP | 08-293414 A | 11/1996 |

(Continued)

*Primary Examiner*—Stephen W Jackson
*Assistant Examiner*—Zeev Kitov
(74) *Attorney, Agent, or Firm*—Sughrue Mion, PLLC

(57) ABSTRACT

An electrical load is supplied with power from a driving power source, and a microprocessor (CPU) controls the opening/closing current supply rate (duty factor) of an opening/closing element in accordance with target current and driving power source voltage so that open loop control is carried out to achieve predetermined target current. The voltage between both the ends of a current detecting resistor connected to the ground side of the opening/closing element is input as a monitoring voltage from a current detecting amplifying circuit portion through a multichannel AD converter to CPU. When the error between the comparison target voltage corresponding to the target current and the monitoring voltage is above a first permissible error, CPU judges that there is an abnormality sign, and if the error is above a larger second permissible error, CPU judges that there is appearing abnormality. Accordingly, an abnormality sign of a semi-wire-breaking/semi-short-circuit state of the electrical load can be sensed, and abnormality notification can be carried out.

8 Claims, 7 Drawing Sheets

FOREIGN PATENT DOCUMENTS

| | | |
|---|---|---|
| JP | 11-099938 A | 4/1999 |
| JP | 11-136846 A | 5/1999 |
| JP | 2001-45651 A | 2/2001 |
| JP | 2002-324710 A | 11/2002 |
| JP | 2003-343286 A | 12/2003 |

* cited by examiner

NON-FEEDBACK TYPE LOAD CURRENT CONTROLLER

BACKGROUND OF THE INVENTION

1. Field of the Invention

The present invention relates to an improvement of a non-feedback type load current controller for controlling the current supply rate (i.e., duty factor) corresponding to the rate between a current supply term and a current supply period of a semiconductor opening/closing element for driving a current consumer in response to the values of supply target current and driving power source voltage for an inductive electric load such as an electromagnetic solenoid for driving a shift gear switching electromagnetic valve in a multistage automatic transmission for a vehicle, for example.

2. Description of the Related Art

A control circuit for driving an electrical load has been generally and broadly used to detect occurrence of breaking of wire/short-circuiting of an electrical load or an opening/closing element or detect breaking of load wires or occurrence of abnormality of high-level short-circuit (i.e., short-circuit to the positive side of the power source)/grounding and notify abnormality, or prevent burnout of the opening/closing element.

For example, JP-A-8-293414 discloses the following solenoid failure detecting device. That is, in a current supply circuit including a current detecting resistor, an opening/closing element and a solenoid as an inductive electrical load which are connected to one another in this order from a driving power source, the voltage between both the ends of electrical load is converted to binary values of "H" and "L", and input to an operation unit as a microprocessor. The presence or absence of wire breaking of the electrical load is detected when the opening/closing element is opened (i.e., under an open circuit condition), and the presence or absence of short-circuiting of the electrical load is detected when the opening/closing element is closed (i.e., under a close circuit condition). When the open circuit condition of the opening/closing element is normally continued, the opening/closing element is closed (i.e., set to a close circuit condition) during only a short time period when the electrical load does not operate effectively to thereby detect the presence or absence of short-circuiting. When the close circuit condition of the opening/closing element is normally continued, the opening/closing element sets the open circuit condition during only a short time period when the electrical load is not non-operated to thereby detecting the presence or absence of breaking.

Furthermore, JP-A-5-217737 discloses a linear solenoid driving device including a current detecting unit for detecting current flowing in a linear solenoid, an error signal generating unit for integrating the difference between the detection result of the current detecting unit and target current to generate an error signal, a current supply control unit for controlling the current supply to the linear solenoid on the basis of the error signal generated in the error signal generating unit, and a failure detecting unit for comparing the error signal generated in the error signal generating unit with a preset reference signal in magnitude and detecting a failure of the driving device in accordance with the comparison result.

The driving device of the linear solenoid is constructed as a current supply circuit by connecting an opening/closing element as the current supply control unit, a linear solenoid as the electrical load and a current detecting resistor as the current detecting unit in series in this order and then connecting these elements to a driving power source.

The solenoid failure detecting device disclosed in the JP-A-8-293414 has no current control function for the solenoid, and it is merely designed so that the power supply state and the power non-supply state are switched to each other by the opening/closing element. Accordingly, for example, in the case of occurrence of a semi-breaking state where the power supply circuit resistance is slightly increased due to incomplete contact of a connection connector containing in the power supply circuit or in the case of occurrence of a semi-short-circuiting state where the load resistance is slightly reduced due to interlayer short-circuiting of a coil of the solenoid or the like, the solenoid failure detecting device described above cannot detect such an abnormality sign as described above.

Furthermore, subtle time control is needed to inversely operate the opening/closing element for only a short time without affecting the operation state of the electrical load and check abnormality in the close circuit period or open circuit period of the opening/closing element, and thus there is a risk that the electrical load erroneously operates in an unintentional state.

Furthermore, the linear solenoid driving device disclosed in JP-A-5-217737 is designed so as to carry out feedback type current control based on current detection. Even when the semi-breaking state or the semi-short-circuiting state as described above occurs, the power supply voltage is automatically corrected so that predetermined target current can be achieved, whereby the error signal is prevented from increasing.

Accordingly, if the resistance of the electric load does not vary over a level at which the correction based on the feedback control is difficult, an abnormality state cannot be detected, and thus any abnormality sign cannot be detected.

Furthermore, when the connection point between the opening/closing element and the electrical load is grounded to a ground circuit due to mixed touch, the stress applied to the opening/closing element would be excessively increased even if the opening/closing element is urgently interrupted because the current detecting resistor does not function as a current limiting resistor for the opening/closing element. Therefore, there is a risk that the opening/closing element is damaged.

SUMMARY OF THE INVENTION

The present invention has been implemented to solve the problem described above, and has an object to provide a non-feedback type load current controller that can detect a semi-breaking state or semi-short-circuiting state of a power supply circuit to judge the presence or absence of an abnormality sign, and inform abnormality if there is any abnormality sign, whereby maintenance and check can be promoted before a serious accident occurs, and the safety can be enhanced.

Furthermore, the present invention has also an object to provide a non-feedback type load current controller in which when an abnormality sign state is left unchecked and thus the abnormality state falls into a more risky state, the state is judged as an appearing abnormality state and the driving of the load is stopped to thereby enhance the safety.

In order to attain the above objects, according to an aspect of the present invention, a non-feedback type load current device is equipped with a power supply driving circuit portion constructed by an in-series circuit comprising a driving power source, an inductive electrical load and an opening/closing element, and a power supply control circuit portion for controlling the current supply rate (i.e., duty factor) corresponding to the rate between a current supply term and a current supply period of the opening/closing element in response to the values of a supply target current and a driving power source voltage to be applied to the electrical load, wherein the power supply driving circuit portion comprises a current detecting resistor connected between the opening/closing element and a ground circuit of the driving power source, a current detecting amplifying circuit portion provided with an operational amplifier for amplifying the voltage between both the terminals of the current detecting resistor and a smoothening capacitor that is provided to at least one of an input circuit and an output circuit of the operational amplifier and achieves a measurement voltage substantially proportional to the average value of the voltage between both the terminals of the current detector resistor, and a commutating circuit that is connected to the electrical load in parallel and subjects the load current supplied when the opening/closing element is under the close circuit condition to flow-back and attenuation when the opening/closing element is opened.

The power supply control circuit portion is equipped with a microprocessor supplied with power from a control power source unit that is supplied with power from the driving power source and generates a stabilized control power source voltage lower than the driving power source voltage, a multi-channel AD converter to which plural analog signals are input, and a non-volatile program memory that stores a load current control program in cooperation with the microprocessor and contains a program as an abnormality sign detecting unit, wherein the output of the operational amplifier is input to the microprocessor through the multi-channel AD converter as a monitor voltage which is limited to a value not more than the control power source voltage, the abnormality sign detecting unit generates an abnormality notification instructing output when the relative error between the comparison target voltage corresponding to the supply target current and the monitor voltage is out of a first permissible error width in which the relative error is slightly deviated from a normal value range, and the measurement voltage when the abnormality sign detecting unit carries out abnormality detection is set to a value less than the control power source voltage.

The non-feedback type load current controller of the present invention is designed to have the circuit construction that the current detected by the current detecting resistor is input to the microprocessor through the current detecting amplifying circuit portion and the multi-channel AD converter although it is originally an open loop type non-feedback control system needing no current detection.

However, the circuit construction is designed so that the current detecting resistor and the electrical load are disconnected by the opening/closing element, and the load current at the time point when the opening/closing element is closed flows in the current detecting resistor while no commutating load current flows in the commutating circuit when the opening/closing element is opened (i.e., sets the open circuit condition), and the measurement voltage achieves the average value of the load current by the smoothening capacitor.

Accordingly, according to the non-feedback type load current controller of the present invention having the circuit construction described above, with respect to occurrence of a short-circuit accident of an electrical load or a high-level short-circuit accident due to the mixed touch between a negative-side wire and a positive-side power supply line, the current detecting resistor takes a role of a limiting resistor for a transit period until the opening/closing element is urgently interrupted, so that an excessively large stress applied to the opening/closing element can be reduced.

In the case of the feedback control system, when the resistance value is varied in association with the semi-breaking/semi-short-circuit abnormality of the electrical load, the applied voltage is automatically adjusted so as to achieve target current. However, in the case of the non-feedback control system, since the detected current is varied, an abnormality sign can be detected by monitoring the output of the AD converter in the microprocessor and thus abnormality can be notified.

The foregoing and other objects, features, aspects and advantages of the present invention will become more apparent from the following detailed description of the present invention when taken in conjunction with the accompanying drawings.

BRIEF DESCRIPTION FO THE DRAWINGS

DETAILED DESCRIPTION OF THE INVENTION

Figure 1:
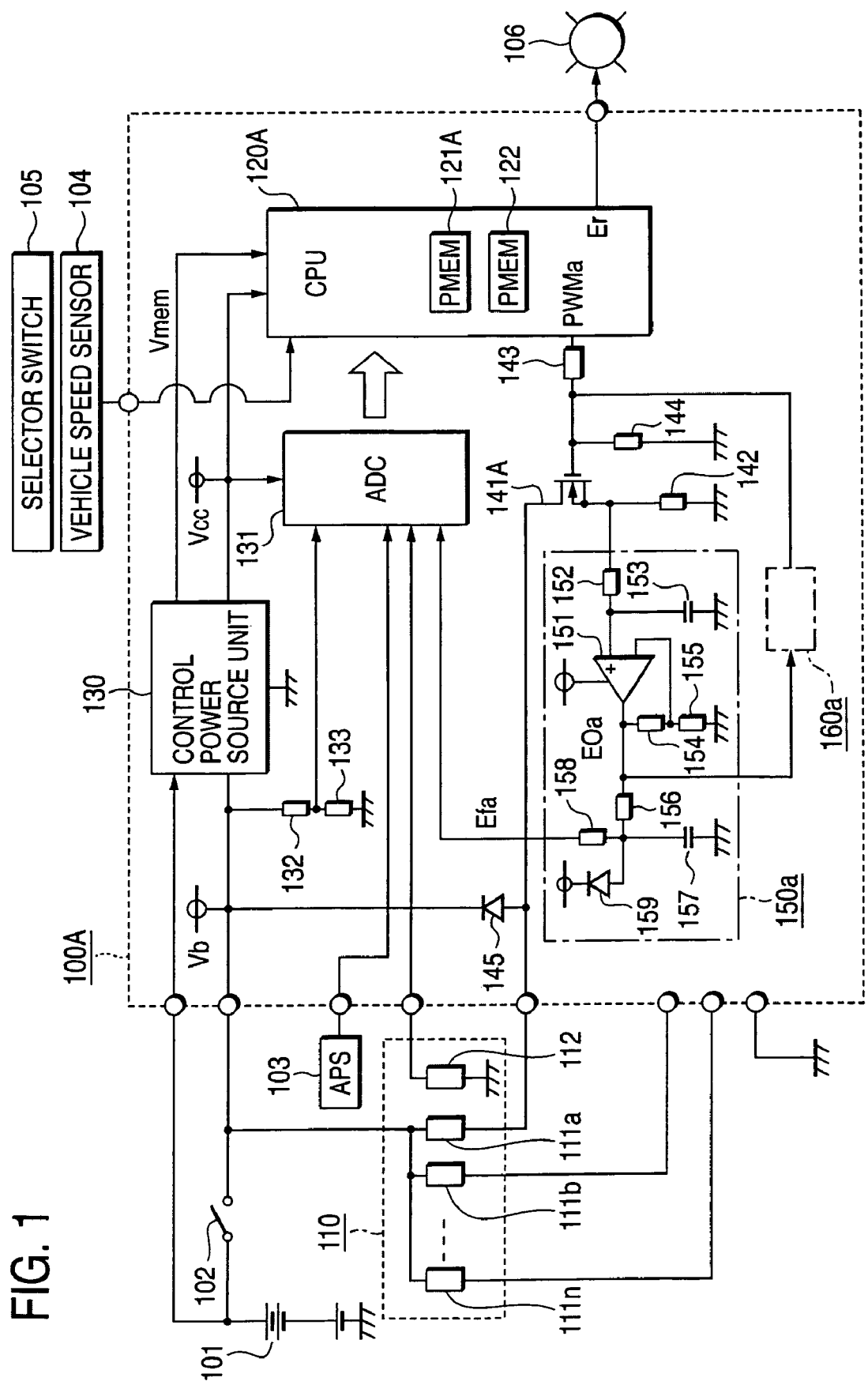
FIG. 1 is a block diagram showing the construction of a non-feedback type load current controller according to a first embodiment.

Preferred embodiments according to the present invention will be described hereunder with reference to the accompanying drawings.

In the figures, the same reference numerals represent the same or corresponding elements.

First Embodiment

FIG. 1 is a block diagram showing the construction of a non-feedback type load current controller according to a first embodiment of the present invention.

In FIG. 1, reference numeral 100A represents a non-feedback type load current controller according to the first embodiment, and the non-feedback type load current controller 100A constitutes a controller for an automatic transmission for a vehicle, for example. Power is supplied from a driving power source 101 as an in-vehicle mount battery through a power supply switch 102 such as a key switch or the like.

The non-feedback type load current controller 100A is supplied with signals from an accelerator position sensor (APS) 103 for detecting the tread degree of an accelerator pedal (not shown), a vehicle speed sensor 104, a selector switch 105 for detecting the selected position of a selector lever, a temperature sensor (for example, oil temperature sensor) 112 for detecting the temperature of lubricating oil of a multistage automatic transmission 110, etc.

The multistage automatic transmission 110 is provided therein with plural inductive electric loads 111a, 111b, . . . , 111n corresponding to electromagnetic solenoids for switching the multistage shift gears such as five shift gears for forward movement and one shift gear for backward movement, for example, and power is supplied from the non-feedback type load current controller 100A to the multistage automatic transmission 110 to drive the multistage automatic transmission 110.

Furthermore, an alarm display unit 106 is driven on the basis of an abnormality notification instruction output Et generated by a microprocessor (CPU) 120A described later when an abnormality state occurs.

With respect to the internal construction of the non-feedback type load current controller 100A, the microprocessor 120A to which an opening/closing signal based on the vehicle speed sensor 104 and the selector switch 105 is input contains a non-volatile program memory 121A and a RAM memory 122 for operational processing which are based on flash memories or the like, and it is driven with a control power source voltage Vcc generated by a control power source unit 130 described later.

The control power source unit 130 serving as a constant voltage power supply circuit is supplied with a driving power source voltage Vb (for example, DC 8 to 16V) from the driving power source 101 through a power source switch 102, and generates a stabilized control power source voltage Vcc (for example, DC 5V) smaller than the minimum value of the driving power source voltage Vb. In addition, the control power source unit 130 also generates a backup voltage Vmem for holding the RAM memory 122 under electric power failure by directly supplying the driving power source voltage Vb from the driving power source 101 without passing through the power source switch 102.

The control power source voltage Vcc is supplied to a multichannel AD converter (ADC) 131, and the analog input terminals thereof are supplied with a voltage which is divided by voltage dividing resistors 132 and 133 and proportional to the driving power source voltage Vb, a tread detection signal of the accelerator pedal from the accelerator position sensor (ASP) 103, environmental temperature signals of the electric loads 111a, 111b, . . . , 111n from the temperature sensor 112, and monitoring voltages Efa, Efb, . . . , Efn described later, and also the digital conversion value of each of the analog signals is input to the microprocessor 120A.

The positive side thermals of the electric loads 111a, 111b, . . . , 111n are connected to the positive side terminals of the driving source 101 through the power source switch 102, and the negative side terminal of the electric load a 111a is connected through the opening/closing element 141A as an N-channel type electric field transistor and a current detecting resistor 142 to a ground circuit to which the negative side terminal of the driving power source 101 is connected.

The construction of the control circuit for the electric loads 111a, 111b, . . . , 111n is the same as described above, and the control elements associated with the electric loads 111b, . . . , 111b are not shown.

The gate terminal of the opening/closing element 141A is supplied with current from the opening/closing instructing output PWMa of the microprocessor 120A through the driving resistor 143 to be driven, and an open circuit stabilizing resistor 144 is connected between the gate terminal of the opening/closing element 141A and the ground circuit. A diode constituting the commutating circuit 145 is connected between the positive and negative terminals of the electric load 111a in parallel.

The PWM power supply circuit 140a (see FIG. 2) containing the opening/closing element 141A, the current detecting resistor 142, the commutating circuit 145, the driving resistor 143 and the stabilizing resistor 144 is provided in association with the electric load 111a, and PWM power supply circuits 140a to 140n are constructed in association with the respective electric loads 111a to 111n, and the microprocessor 120A supplies opening/closing instructing outputs PWMa to PWMn to the respective PWM power supply circuits 140a to 140n.

The current detecting amplifying circuit portion 150a is used to smoothen and amplify the voltage between both the ends of the current detecting resistor 142 belonging to the PWM power supply circuit 140a, and current detecting amplifying circuit portions 150a to 150n are provided in association with the PWM power supply circuits 140ato 140n.

That is, the current detecting amplifying circuit portions 150a to 150n are provided in association with the respective electric loads 111a to 111n. In FIG. 1, only the current detecting amplifying circuit portion 150a is shown.

The non-inverting input terminal of the operational amplifier 151 is connected to the connection point between the current detecting resistor 142 and the source terminal of the opening/closing element 141A through an input resistor 152, and also connected to the ground circuit through a smoothening capacitor 153.

A measurement voltage E0a which is an output voltage of the operational amplifier 151 and measured for an abnormality sign detecting unit described later to detect abnormality (hereinafter referred to as a measurement voltage) is subjected to voltage division by voltage dividing resistors 154 and 155 and negatively fed back to the inverting input terminal, and charges a smoothening capacitor 157 through a current limiting resistor 156. The charged voltage of the smoothening capacitor 157 is applied to the input terminal of the multichannel AD converter 131 through an input resistor 158, and input as a monitoring voltage Efa.

When the charged voltage of the smoothening capacitor 157 is excessively large, it is suppressed to the control power source voltage Vcc level through a voltage limiting diode 159. However, at the stage that the measurement voltage E0a is not more than the control power source voltage Vcc and it is not regulated by the voltage limiting diode 159, the measurement voltage E0a and the monitoring voltage Efa have the same value.

When the measurement voltage E0a corresponding to the output voltage of the operational amplifier 151 exceeds a predetermined value, an over-current abnormality detecting circuit 160a described later acts to interrupt the gate voltage of the opening/closing element 141A and prevent excessively large current from flowing in the opening/closing element 141a.

Figure 2:
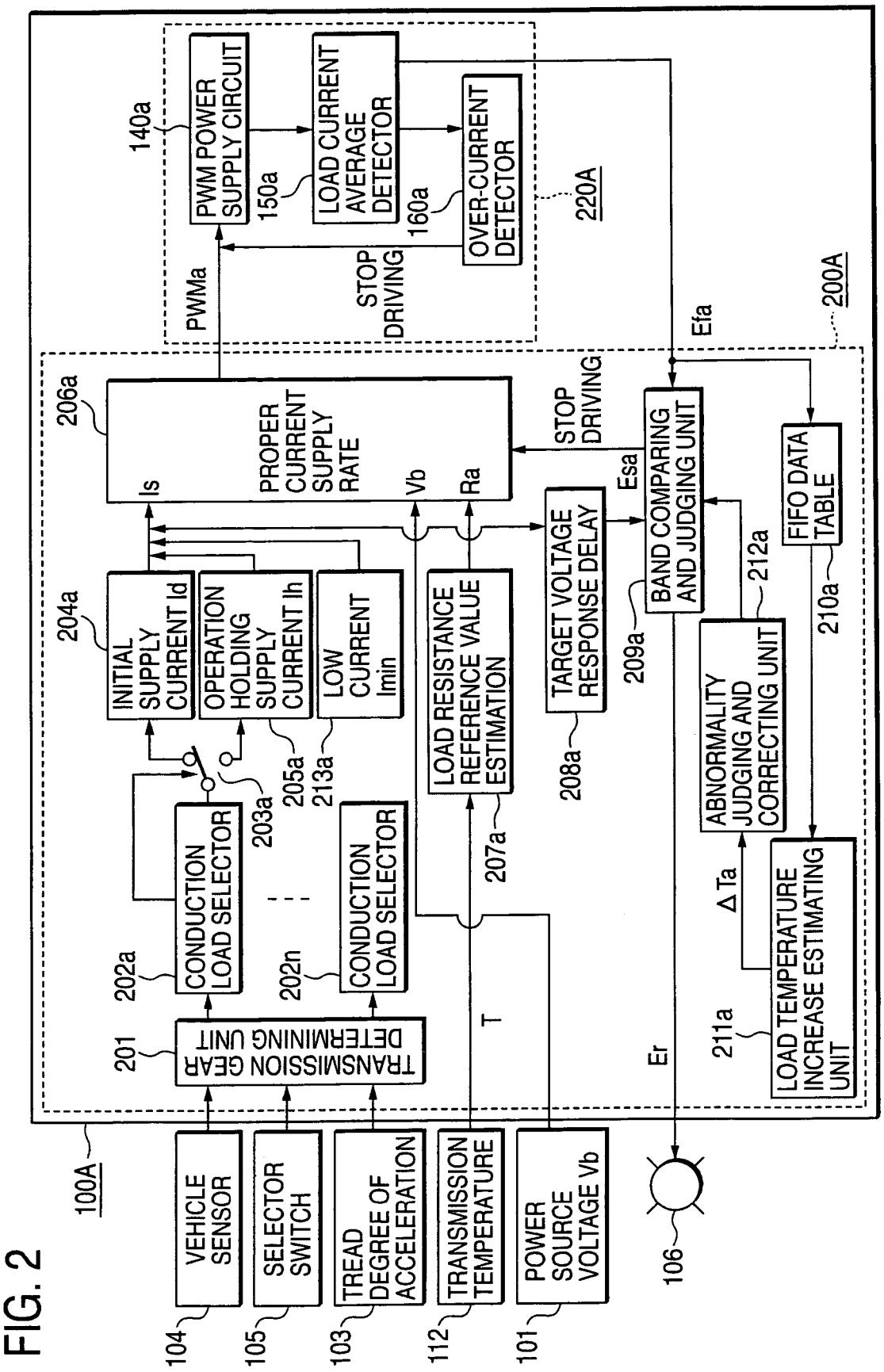
FIG. 2 is a block diagram showing the operation of the non-feedback type load current controller according to the first embodiment.

FIG. 2 is a block diagram showing the operation of the non-feedback type load current controller according to this embodiment shown in FIG. 1.

In FIG. 2, the non-feedback type load current controller 100A is divided into a power supply control circuit portion 200A containing the microprocessor 120A as a main element and a power supply driving circuit portion 220A containing the PWM power supply circuits 140a to 140n as main elements.

The power supply driving circuit portion 220A contains the current detecting amplifying circuit portions 150a to 150n and the over-current abnormality detecting circuits 160a to 160n, and the current detecting amplifying circuit portions 150a to 150n generate monitoring voltages Efa to Efn.

The power supply control circuit portion 200A for generating the opening/closing instruction outputs PWMa to PWMn mainly comprises a shift gear determining unit 201, proper current supply rate calculating units 206a to 206n, comparison target voltage setting units 208a to 208n, band comparing and judging units 209a to 209n, etc.

The shift gear determining unit 201 determines a proper shift gear on the basis of information concerning the tread degree of the accelerator pedal achieved from the accelerator position 103, vehicle speed information achieved from the vehicle speed sensor 104 and information concerning the selected position of a shift lever achieved from the selector switch 105, and one of instruction memories 202a to 202n which corresponds to a selected solenoid to be supplied with current and operated is activated from the electric loads 111a to 111n serving as the electromagnetic solenoids.

For example, just after the instruction memory 202a is activated, a driving initial current setting unit 204a is selected through a current supply switching unit 203a, and driving initial current Id is set as supply target current Is to the electrical load 111a.

When a predetermined time needed to complete the operation of the electromagnetic valve elapses in connection with increase of the load current, the selected position of the current supply switching unit 203a is switched, an operation holding current setting unit 205a is selected, and operation holding current Ih is set as the supply target current Is.

Figure 3:
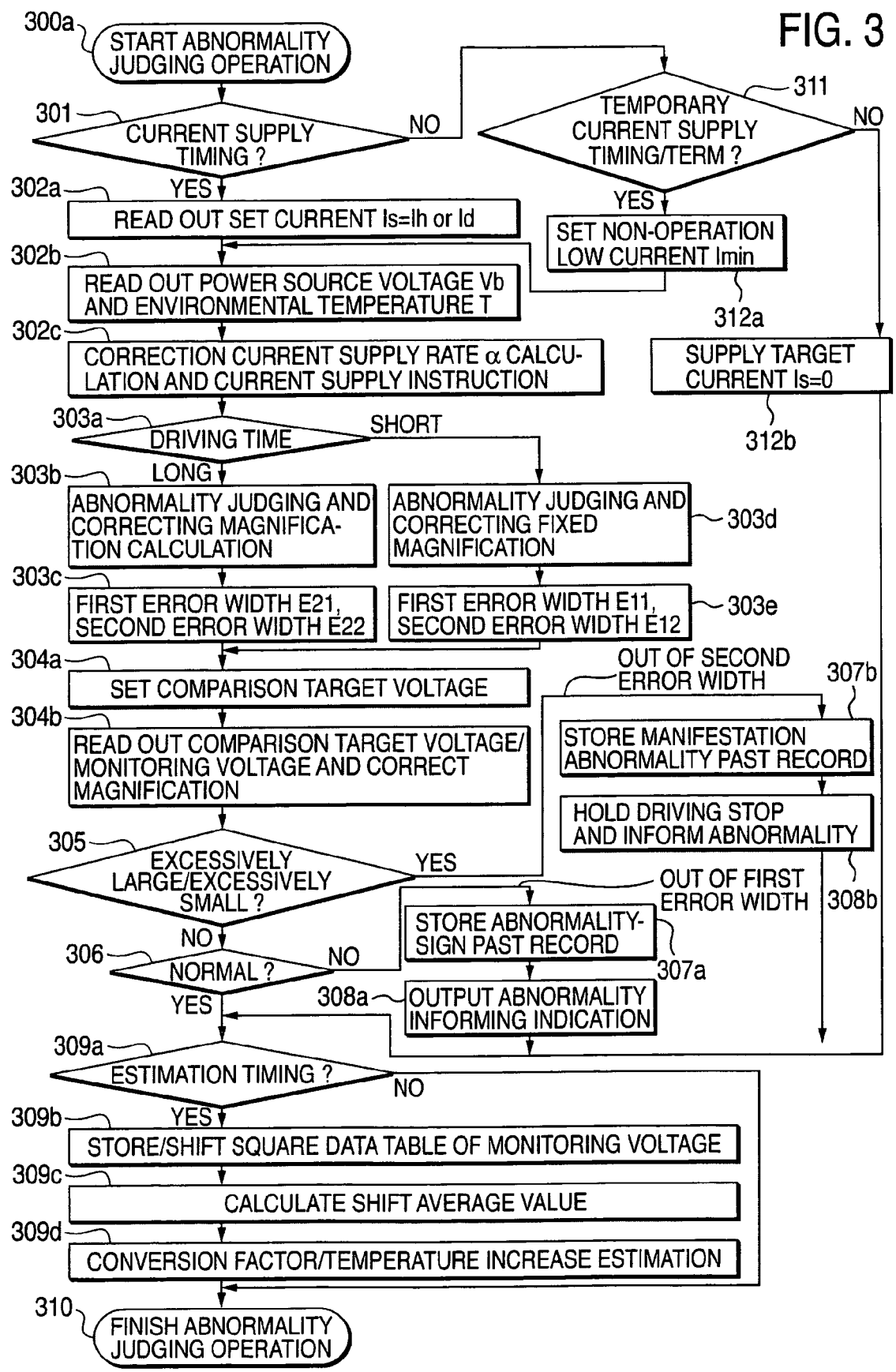
FIG. 3 is a flowchart showing the operation of the non-feedback type load current controller according to the first embodiment.

During the current non-supply period to the electrical load 111a, the supply target current Is is equal to zero, however, non-operation low current Imin is periodically set as the supply target current Is for only a short time by the action of an non-operation low current setting unit 213a corresponding to a step 312a in FIG. 3.

The values of the supply target current Is (0, Imin, Ih, Id), the value of the driving power source voltage Vb and the value of the load resistor Ra of the electrical load 111a are input to the proper current supply rate calculating unit 206a.

The load resistor Ra of the electrical load 111a is calculated from the following equation by a load resistance estimating unit 207a.

$$Ra = K1 + K2 \times T + K3 \times \Delta Ta \quad (1)$$

$\Delta Ta=0$, or $\Delta Ta$ max, or $\Delta Ta$ max/2 K1, K2, K3=constants However, T represents the environmental temperature of the electrical loads 111a to 111n detected by the temperature sensor 112, and in the case of an automatic transmission, an oil temperature sensor for detecting the temperature of lubricating oil is used.

$\Delta Ta$ represents the temperature increase value of the electric load 111a determined by the past record of the supply current to the electrical load 111a and the thermal time constant of the electrical load. In this embodiment, for example, the load resistance Ra is calculated on the assumption that $\Delta Ta=0$ or it is the fixed value of the estimated maximum temperature increase value $\Delta Ta$ max or the average estimated temperature increase value $\Delta Ta$ max/2.

The proper current supply rate calculating unit 206a calculates the current supply rate $\alpha$ from the equation (2) on the basis of the values of the supply target current Is, the driving power source voltage Vb and the load resistance Ra.

$$\alpha = Is \times Ra/Vb \quad (2)$$

Upon input of a voltage proportional to the supply target current Is to the electrical load 111a, the comparison target voltage set unit 208a is operated, and generates a comparison target voltage Esa having the response delay corresponding to the smoothening time constant of the smoothening capacitors 153/157 in the current detecting amplifying circuit portion 150a. The smoothening time constant of the smoothening capacitor 153/157 is set to the value corresponding to the current time constant which is the rate between the inductance and resistance value of the electrical load 111a.

The band comparing and judging unit 209a compares the comparison target voltage Esa achieved from the comparison target voltage setting unit 208a and the monitoring voltage Efa achieved from the current detecting amplifying circuit portion 150a. It generates an abnormality notification instructing output to actuate the alarm display unit 106 when the comparison result has divergence, or it acts on the proper current supply rate calculating unit 206a to set the current supply rate $\alpha$ to zero when the comparison result has excessive divergence.

A load temperature increase estimating unit 211a is constructed by a calculating unit for storing the square value of the monitoring-voltage Efa to the electrical load 111a into a first-in first-out (FIFO) data table 210a in which data are periodically stored over at least a period not less than the thermal time constant of the electrical load 111a, calculating the moving average value concerning plural data thus stored and multiplying the moving average value by a temperature conversion coefficient, and it serves as a unit for estimating the present temperature increase value $\Delta Ta$ added with the thermal time constant of the electrical load.

In place of the monitoring voltage Efa, the square value of the set voltage corresponding to the supply target current Is to the electrical load 111a or the comparison target set voltage Esa may be stored as the data stored in the first-in first-out data table 210a.

An abnormality judging and correcting unit 212a reduces the value of the comparison target voltage Esa compared by the band comparing and judging unit 209a in response to the temperature increase value $\Delta Ta$ of the load estimated by the load temperature increase estimating unit 211a, or increases the monitoring voltage Ef to thereby carry out band comparison.

This is because the load resistor Ra applied in the equations (1) and (2) does not contain any variation based on the current supply temperature increase of the electrical load 111a, and thus the variation concerned is corrected at the comparison stage to thereby carry out the high-precision comparison.

The same processing is carried out when the operation of the other electrical loads 111b to 111n is selected, the opening/closing instructing outputs PWMb to PWMn are generated, and the corresponding monitoring voltages Efb to Efn are achieved, whereby the abnormality judgment for each of the electrical loads 111b to 111n is carried out.

The proper current supply rate calculating unit 206a corresponds to the step 302c in FIG. 3, the comparison target voltage setting unit 208a corresponds to step 304a in FIG. 3, the band comparing and judging unit 209a corresponds to steps 305/306 in FIG. 3, the load temperature increase estimating unit 211a corresponds to step 309d in FIG. 3, the abnormality judging and correcting unit 212a corresponds to step 303b in FIG. 3.

Next, the abnormality judging operation of the non-feed back type load current controller according to the first embodiment of the present invention shown in FIG. 1 will be described with reference to the flowchart of FIG. 3.

In FIG. 3, step 300a is a step of starting the abnormality detecting operation concerning the electrical load 111a by the microprocessor 120A, and the subsequent step 301 is a judging step of judging whether a current supply timing to the electrical load 111a has come or not. If it is judged that the current supply timing has come, the step shifts to step 302a, and if not so, the step shifts to step 311.

In the judgment of step 301, by judging whether the instruction memory 202a of FIG. 2 stores current supply instruction information, it is judged whether the current supply timing has come.

Step 302a is a step of setting as supply target current Is the driving initial current Id which is set by the driving initial current setting unit 204a or the operation holding current setting unit 205a in accordance with the operation position of the current supply switching unit 203a of FIG. 2, and reading out the supply target current thus set. The subsequent step 302b is a step of reading out the driving power source voltage Vb and the environmental temperature T input to the multichannel AD converter 131, and the subsequent step 302c is a step as the current supply rate calculating unit for calculating the proper current supply rate α on the basis of the calculation equations (1) and (2) and generating the opening/closing instructing output PWMa to the opening/closing element 141A on the basis of the current supply rate thus calculated.

The subsequent step 303a is a judgment step serving as the selection switching unit for judging whether the time after the operation is started exceeds a predetermined time, and shifting to step 303b if a long time elapses while shifting to step 303d if a short time elapses, and the judgment as to the operation time in the step 303a is carried out by judging whether data of a predetermined score or more are stored in the first-in first-out data table in step 309c described later.

Step 303b is a step serving as the abnormality judging and correcting unit for calculating a corrected current supply rate β adapted to the present temperature from the calculation equations (1) and (2), and calculating the ratio β/α between the corrected current supply rate β and the proper current supply rate α calculated in step 302c as a corrected magnification.

The subsequent step 303c is a step for selecting E21 (for example, ±10%) as a first permissible error width for judging an abnormality sign as described later with reference to FIG. 4, and selecting E22 (for example, ±20%) as a second permissible error width for judging appearing abnormality.

Step 303d is a step of invalidating the executed abnormality judgment and correction when the current supply temperature increase of the electric load 111a is not yet determined in step 309d described later. The subsequent step 303e serves as the permissible error width correcting unit for selecting E11 (for example, ±30%) as a first permissible error width for judging the abnormality sign described later and selecting E12 (for example, ±40%) as a second permissible error width for judging appearing abnormality.

The proper current supply rate α calculated in step 302c is calculated from the equations (1) and (2) on the basis of an assumed temperature increase value based on any one of an initial temperature system based on ΔTa=0, a maximum temperature system based on ΔTa=ΔTa max or an average temperature system based on ΔTa=ΔTa max/2 with neglecting the variation of the current supply temperature increase ΔTa of the electrical load 111a.

Accordingly, since the monitoring voltage Efa is varied in accordance with the value of the actual current supply temperature increase ΔTa, the permissible error width based on the step 303e is larger than the permissible error width based on the step 303c, so that the abnormality judgment can be prevented from being carried out needlessly.

Step 304a executed subsequently to the step 303c or 303e is a step serving as the comparison target voltage setting unit that operates upon input of the voltage proportional to the supply target current Is read out in step 302a or the non-operation low current Imin set in step 312a described later and generates a comparison target voltage Es having the response delay corresponding to the smoothening time constant of the smoothening capacitors 153/157 in the current detecting amplifying circuit portion 150a, and the smoothening time constant of the smoothening capacitors 153/157 becomes the value corresponding to the current time constant which is the ration between the inductance and resistance value of the electric load.

The subsequent step 304b reads out the present value of the comparison target voltage Esa calculated in step 304a and the present value of the monitoring voltage Efa, and also carries out the correction processing based on the correction magnification calculated in step 303b to any one of the comparison target voltage Esa and the monitoring voltage Efa thus read out. The correction processing is not carried out when the time after the operation is started is short.

The subsequent step 305 is a step serving as the appearing abnormality detecting unit for judging whether the relative error between the comparison target voltage Esa and the monitoring voltage Efa which are read out and corrected in step 304b is an excessively large current state or excessively small current state where the relative error is out of the second permissible error width E22 or E12 selected in step 303c or step 303e. When the judgment of step 305 is an excessively large/excessively small abnormality judgment, the step shifts to step 307b to preserve the appearing abnormality past record into the RAM memory 122, and then the step shifts to step 308b.

Step 308b is a step serving as the driving stop unit for turning on and off the alarm display unit 106 by intermitting the abnormality notification instructing output Er, and also generating the driving stop instruction to set the proper current supply rate α in step 302c to zero.

When step 308b generates the driving stop instruction, this state is stored and no opening/closing instructing output PWMa is generated from the driving stop time until the restart time.

When the judgment of the step 305 is not the judgment of the excessively large/excessively small abnormality, the step shifts to step 306. The step 306 is a step serving as the abnormality sign detecting unit for judging whether the relative error between the comparison target voltage Esa and the monitoring voltage Efa which are read out and corrected in step 304b is within the first permissible error width E21 or E11 selected in step 303c or 303e (i.e., a normal state) or out of the first permissible error width E21 or E11 (abnormality sign occurring state). When the judgment of the step 306 is the judgment that there is some abnormality sign, the step shifts to step 307a to preserve the abnormality sign past record into the RAM memory 122, and then the step shifts to step 308a.

The step 308a is a step serving as the abnormality notification instruction output unit for generating the abnormality notification instructing output Er and turning on the alarm display unit 106.

Step 309a executed when the judgment of the step 306 is a normal judgment or subsequently to step 308a/308b or subsequently to step 312b described later is a step for judging whether the timing for executing subsequent steps 309b to 309d has come, and the judgment of Yes is substantially periodically carried out at a period τ such as about once per 10 seconds.

The step 309b executed when the judgment of the step 309a is YES is a step of storing and preserving the average value of the square value of the monitoring voltage Efa during the previous period τ, or briefly a representative value such as the square value of a simple average value or the like into the first-in first-out data table, and also deleting the head data by carrying out a movement shift operation of the first-in first-out data table. For example, when the thermal time constant τa of the electrical load is equal to 500 seconds, the first-in first-out data table moves and stores one hundred data at an interval of period τ=10 seconds, and the current supply past record is preserved over the double time of the thermal time constant τa.

The data stored in the first-in first-out data table is preferably the square representative value of the monitoring voltage Efa, however, the square representative value of the target voltage proportional to the supply target current or the comparison target voltage may be used in place of the monitoring voltage Efa.

The subsequent step 309c is a step of calculating the moving average values of many square data stored by step 309b, and the subsequent step 309d is a step serving as the load temperature increase estimating unit for multiplying the moving average value calculated in the step 309c by the temperature conversion coefficient to estimate the present current supply temperature increase value ΔTa.

When the judgment of the step 309a is NO, the step 310 executed subsequently to the step 309d is a termination waiting step of the abnormality judging operation. In this step 310, after the microprocessor 120A carries out the abnormality judgment on the other electrical loads 111b to 111n or carries out the calculation processing shown in the shift gear determining unit 201 of FIG. 2, the initial step 300a is activated again.

Step 311 executed when the judgment of step 301 is NO and the current supply timing to the electrical load 111a has not yet come is a step serving as the temporary current supply timing judging unit for carrying out the judgment of YES for only one second at an interval of several minutes, and shifting the step to the subsequent step 312a. In the non-operation period band of the electrical load 111a, the step 312a is a step serving as the non-operation low current setting unit for setting the non-operation low current Imin having a level at which the electrical load 111a does not carry out an effective operation, and the step shifts to step 302b subsequently to step 312a.

When the judgment of the step 311 is NO, the step shifts to step 312b. In step 312b, the value of the supply target current Is is set to zero and then the step shifts to step 309a.

The abnormality past record information stored in the steps 307a/307b is read out and displayed through an external tool (not shown) serially connected to the microprocessor 120A in the maintenance and check work to provide maintenance and checking information such as the number of an electrical load under abnormality, classification as to an abnormality sign or an appearing abnormality, classification as to whether the permissible error width is exceeded or not, etc., and the abnormality past record information thus displayed is reset in connection with the completion of the maintenance and check work.

The RAM memory 122 in which the abnormality past record information is stored is held even under electric power failure with the backup voltage Vmem generated by the control power source unit 130 even when the power source switch 102 is set to the open circuit condition. However, in order to adapt to detachment of the driving power source 101 or abnormal voltage reduction, it is possible to timely transfer and save the abnormality past record information to a non-volatile memory (not shown) or the like.

Figure 4:
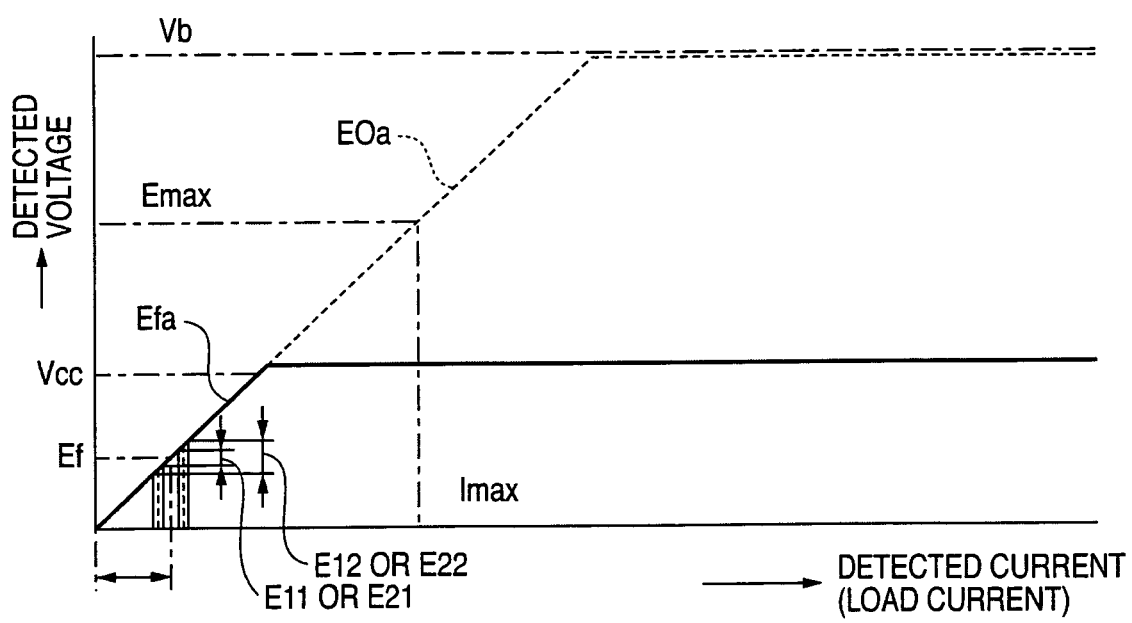
FIG. 4 is a characteristic diagram showing the operation of the non-feedback type load current controller according to the first embodiment.

FIG. 4 is an operating characteristic diagram showing the operation of the non-feedback type load current controller of this embodiment shown in FIG. 1.

In FIG. 4, the abscissa axis represents the detected current whose value is proportional to the average value of the voltage between both the ends of the current detecting resistor 142, and the detected current corresponds to load current flowing in the electrical load 111a.

In FIG. 4, E0a represents the measurement voltage, Efa represents the monitoring voltage, Vb represents the driving power source voltage (8 to 16V), Vcc represents the control power source voltage (5V), Is represents the supply target current, Imax represents the detected excessively large current, E11 represents the first permissible error width (just after the operation is started), E12 represents the second permissible error width (just after the operation is started), E21 represents the first permissible error width (after a predetermined time elapses), and E22 represents the second permissible error width (after a predetermined time elapses).

The abscissa axis represents the output voltage of the operational amplifier 151 which is achieved by amplifying and smoothening the voltage between both the ends of the current detecting resistor 142. The measurement voltage E0a of the output voltage concerned which is generated at the output terminal of the operational amplifier 151 increases in proportion to the detected current, and finally saturated at a value not more than the driving power source voltage Vb applied to the operational amplifier 151.

The value of the monitoring voltage Efa achieved from the measurement voltage E0a through the current limiting resistor 156 also increases in proportion to the detected current, and finally it is regulated to the level of the control power source voltage Vcc by the voltage limiting diode 159.

The gain of the operational amplifier 151 is set so that the monitoring voltage Ef corresponding to the supply target current Is is not more than the control power source voltage Vcc, and in a precise sense, the monitoring voltage Ef and the control power source voltage Vcc are equal to each other for the 40%-increased current of the driving initial current Id out of the supply target current Is.

When the electrical load 111a is perfectly short-circuited or the negative-side wire of the electrical load 111a is mix-touched with the positive-side power source line of the driving power source 101 and thus a high-level short-circuit accident occurs, excessively large current determined by the driving power source voltage Vb and the resistance value rate of the current detecting resistor 142 is about to flow in the opening/closing element 141A. However, actually, the excessively large current is limited to a value not more than the saturation current determined by the current gain of the opening/closing element 141A.

The value of the limiting threshold value Emax corresponding to the monitoring voltage which corresponds to the detected excessively large current Imax at which the overcurrent abnormality detecting circuit 160a operates is set to the DC 8V level corresponding to the variation minimum value of the driving power source voltage Vb, for example.

The first permissible error width E11/E21 is set to the band width in which normality is judged in step 306 serving as the abnormality sign detecting unit of FIG. 3, and an abnormality sign is judged if the error is out of this band.

The second permissible error width E12/E22 is set to the band width in which abnormality is judged in step 305 serving as the appearing abnormality detecting unit of FIG. 3, and an appearing abnormality is judged if the error is out of this band.

The values of the two types of permissible error widths set as the first permissible error width and the second permissible error width are selectively used in step 303a of FIG. 3. After the load temperature increase is estimated in step 309d, the permissible error width is narrowed, so that the permissible error width is prevented from being increased needlessly to make an abnormality judgment until the load temperature increase is estimated.

As is apparent from the foregoing description, the non-feedback type load current controller 100A according to the first embodiment of the present invention is equipped with the power supply driving circuit portion 220A constructed by the in-series circuit comprising the driving power source 101, the inductive electrical load 111a and the opening/closing element 141A, and the power supply control circuit portion 200A for controlling the current supply rate α between the current supply term and the current supply period of the opening/closing element 141A in response to both the values of the supply target current Is to the electrical load 111a and the driving power source voltage Vb, wherein the power supply driving circuit portion 220A is equipped with the current detecting resistor 142 connected between the opening/closing element 141A and the ground circuit of the driving power source 101, the current detecting amplifying circuit portion 150a comprising the operational amplifier 151 for amplifying the voltage between both the ends of the current detecting resistor 142 and the smoothening capacitor that is provided to at least one of the input circuit and the output circuit of the operational amplifier 151 and achieves the measurement voltage substantially proportional to the average value of the voltage between both the ends of the current detecting resistor 142, and the commutating circuit 145 connected to the electrical load 111a in parallel so that the load current supplied under the close circuit condition of the opening/closing element 141A flows back and attenuates under the open circuit condition of the opening/closing element 141A, thereby smoothening the load current.

The power supply control circuit portion 200A is equipped with the microprocessor 120A supplied with power from the control power source unit 130 that is supplied with power from the driving power source 101 and generates the stabilized control power source voltage Vcc lower than the driving power source voltage, the multichannel AD converter 131 supplied with plural analog signals, and the non-volatile program memory 121A that cooperates with the microprocessor 120A, stores the load current control program and contains the program serving as the abnormality sign detecting unit 306.

The current detecting amplifying circuit portion 150a is equipped with the operational amplifier 151 for amplifying the voltage between both the ends of the current detecting resistor 142, and the smoothening capacitor 153/157 that is provided to at least one of the input circuit and the output circuit of the operational amplifier 151 and achieves the measurement voltage E0 substantially proportional to the average value of the voltage between both the ends of the current detecting resistor 142, and the output of the operational amplifier 151 is input to the microprocessor 120A through the multichannel AD converter 131 as the monitoring voltage Ef limited to the control power source voltage Vcc or less.

Furthermore, the abnormality sign detecting unit 306 generates the abnormality notification instructing output Er when the relative error between the comparison target voltage Es corresponding to the supply target current Is and the monitoring voltage Ef is out of the first permissible error width E11/E21 in which the relative error is slightly deviated from the normal value range, and the measurement voltage E0 when the abnormality sign detecting unit 306 carries out the abnormality detection is set to be less than the control power source voltage Vcc.

Accordingly, the current detecting resistor serves as a current limiting resistor during the transit period from the occurrence of the short-circuit accident of the electrical load or the high-level short-circuit accident in which the negative-side wire and the positive-side power source line are mix-touched with each other till the urgent interruption of the opening/closing element, whereby an excess stress applied to the opening/closing element can be reduced.

Furthermore, with respect to the variation of the resistance value in connection with semi-breaking/semi-short-circuit abnormality of the electrical load, in the case of the feedback control system, the applied voltage is automatically adjusted so as to achieve target current. However, in the case of the non-feedback type control system, since the detected current is varied, an abnormality sign is detected by monitoring the output of the AD converter through the microprocessor and abnormality can be notified.

Still furthermore, the non-volatile program memory 121A further contains programs serving as the appearing abnormality detecting unit 305 and the driving stop unit 308b.

The appearing abnormality detecting unit 305 generates the abnormality notification instructing output Er under the excessively large current state or excessively small current state where the relative error between the comparison target voltage Es corresponding to the supply target current Is and the monitoring voltage Ef is out of the second permissible error width E12/E22 larger than the first permissible error width E11/E21.

Furthermore, when the appearing abnormality detecting unit 305 detects at least the excessively large current state, the driving stop unit 308b acts to set a full-opening instruction to the opening/closing instructing output PWMa to the opening/closing element 141A.

Accordingly, when an abnormality state notified as abnormality for maintenance and check at the occurrence time of the abnormality sign thereof further progresses, the driving of the electrical load is stopped by the appearing abnormality detecting unit to enhance the safety.

The non-volatile program memory 121A contains a program serving as a non-operation low current setting unit 312a.

In the non-operating time zone of the electrical load 111a, for only a short time, the non-operation low current setting unit 312a temporarily supplies as the supply target current Is the non-operation low current Imin having the level at which the electrical load 111a does not effectively operate.

Accordingly, even during the non-operating period of the opening/closing element, an abnormality sign or appearing abnormality can be readily detected under the state that the electrical load is prevented from operating effectively.

The operational amplifier 151 of the current detecting amplifying circuit portion 150a operates when the driving power source voltage Vb of the electrical load 111a is applied to the operational amplifier 151 as a power source voltage, and the measurement voltage E0 corresponding to the output of the operational amplifier 151 is applied as the monitoring voltage Ef through the current limiting resistor 156 to the input terminal of the multichannel AD converter 131. The voltage limiting diode 159 for limiting the monitoring voltage Ef to the level of the control power source voltage Vcc is connected to the input terminal of the multichannel AD converter 131, and the power supply driving circuit portion 220A is further equipped with the over-current abnormality detecting circuit 160a.

The over-current abnormality detecting circuit 160*a* stops the current supply instruction to the opening/closing element 141A when the measurement voltage E0 increases and exceeds a predetermined limiting threshold value Emax after the monitoring voltage Ef is limited to the control voltage Vcc level by the voltage-limiting diode 159.

Accordingly, the over-current abnormality detecting circuit 160*a* operates under the state that the output voltage of the operational amplifier 151 exceeds the control power source voltage Vcc. Therefore, the output voltage of the operational amplifier 151 under the detection state of the abnormality sign or the appearing abnormality can be set to as large a value as possible within the voltage range not more than the control power source voltage Vcc, thereby enhancing the detection precision. In addition, when over-current abnormality occurs, the opening/closing element 141A is interrupted quickly without relying on the microprocessor 120A, and burnout of the opening/closing element 141A can be prevented.

Furthermore, the non-volatile program memory 121A contains a program serving as a proper current supply rate calculating unit 302*c* executed in response to the detection output of the temperature sensor 112 for detecting the environmental temperature of the electrical load 111*a*.

The proper current supply rate calculating unit 302*c* calculates the current supply rate α which is proportional to the target current Is to the electrical load 111*a*, inversely proportional to the driving power source voltage Vb and proportional the load resistance Ra of the electrical load estimated from the environmental temperature T detected by the temperature sensor 112, and determines the ratio between the current supply instruction period and the current supply period of the opening/closing instruction output PWMa to the opening/closing element 141A. Accordingly, the current control precision can be enhanced even in the non-feedback type load current control system, so that the detection precision of the abnormality sign or the appearing abnormality can be enhanced.

Furthermore, the non-volatile program memory 121A further contains programs serving as the load temperature increase estimating unit 309*d* and the abnormality judging and correcting unit 303*b*.

The load temperature increase estimating unit 309*d* estimates the present temperature increase value ΔTa of the electrical load 111*a* in association with the current supply past record to the electrical load 111*a* and the thermal time constant of the electrical load 111*a*, and adds the temperature increase value ΔTa thus estimated and the environmental temperature T detected by the temperature sensor 112 to determine the present temperature of the electrical load 111*a*.

Furthermore, the abnormality judging and correcting unit 303*b* reduces the value of the comparison target voltage Es subjected to the band comparison judgment in the abnormality sign detecting unit 306 or the appearing abnormality detecting unit 305 in accordance with the temperature increase value ΔTa of the load estimated by the load temperature increase estimating unit 309*d*, or increases the monitoring voltage Ef, and the proper current supply rate calculating unit 302*c* determines the current supply rate α on the basis of the driving power source voltage Vb and the environmental temperature T of the electrical load 111*a* irrespective of the temperature increase of the electrical load 111*a* which is caused by the current supply load current.

Accordingly, the abnormality judgment is carried out on the assumption that the difference of the actual load current from the target current is estimated in consideration of the temperature increase of the electrical load caused by the current supply load current and the environmental temperature, whereby the detection precision of the abnormality sign or the appearing abnormality can be further enhanced.

Furthermore, the non-volatile program memory 121A further contains a program serving as a selection switching unit 303*a* and the permissible error width correcting unit 303*e*.

The selection switching unit 303*a* invalidates the abnormality judging and correcting unit 303*b* during a predetermined period after the operation is started.

When the abnormality judging and correcting unit 303*b* is invalidated, the permissible error width correcting unit 303*e* sets the permissible error width in the abnormality judging band comparison to a large value, and it corrects the permissible error width so that the permissible error width is narrow after the abnormality judging and correcting unit 303*b* is validated.

Accordingly, in such a case that the operation is resumed after an uncertain operation cease period, the abnormality judging permissible error width can be prevented from being broadened needlessly to carry out the abnormality judgment until the temperature increase of the electrical load can be estimated.

Furthermore, the load temperature increase estimating unit 309*d* estimates the present temperature increase value added with the thermal time constant of the electrical load by the first-in first-out data table for periodically storing the square representative value of the set voltage corresponding to the supply target current Is to the electrical load 111*a* or the monitoring voltage Efa over at least the period above the thermal time constant of the electrical load 111*a* and the calculating unit for calculating the moving average value concerning plural data store din the data table 210*a* and multiplying the moving average value concerned by a temperature conversion coefficient.

Accordingly, even when the load current varies, the temperature increase of the electrical load which is caused by the current supply load current can be estimated with relatively high precision by the simple calculating unit.

Furthermore, the non-volatile program memory 121A contains a program serving as a comparison target voltage setting unit 304*a*.

The comparison target voltage setting unit 304*a* operates upon input of the voltage proportional to the supply target current Is to the electrical load 111*a*, and generates the comparison target voltage Es having the response delay corresponding to the smoothening time constant of the smoothening capacitor 153/157 in the current detecting amplifying circuit portion 150*a*, and the smoothening time constant of the smoothening capacitor 153/157 is set to the value corresponding to the current time constant which corresponds to the ration between the inductance and resistance value of the electrical load 111*a*.

Accordingly, the abnormality sign or the appearing abnormality can be detected with relatively high precision even during the transit period when the supply target current varies and the load current varies.

Furthermore, the electrical load is each of plural electromagnetic-valve driving electromagnetic solenoids 111*a*, 111*b*, . . . , 111*n* for shift gear switching electromagnetic valves in a multistage automatic transmission 110 for a vehicle, and the supply target current Is to the electromagnetic solenoids 111*a*, 111*b*, . . . , 111*n* is varied in magnitude in accordance with the driving initial current Id and the operation holding current Ih. In addition, the temperature sensor 112 for detecting the environmental temperature of the electromagnetic solenoids 111*a*, 111*b*, . . . , 111*n* may be substituted by the oil temperature sensor for detecting the lubricating oil temperature of the automatic transmission 110.

Accordingly, even the non-feedback control system can perform high-precision current control by actively using the existing oil temperature sensor, and the control load of the microprocessor to the many electromagnetic solenoids can be more greatly reduced as compared with the feedback type current controller to which high-speed response is required.

Second Embodiment

Figure 5:
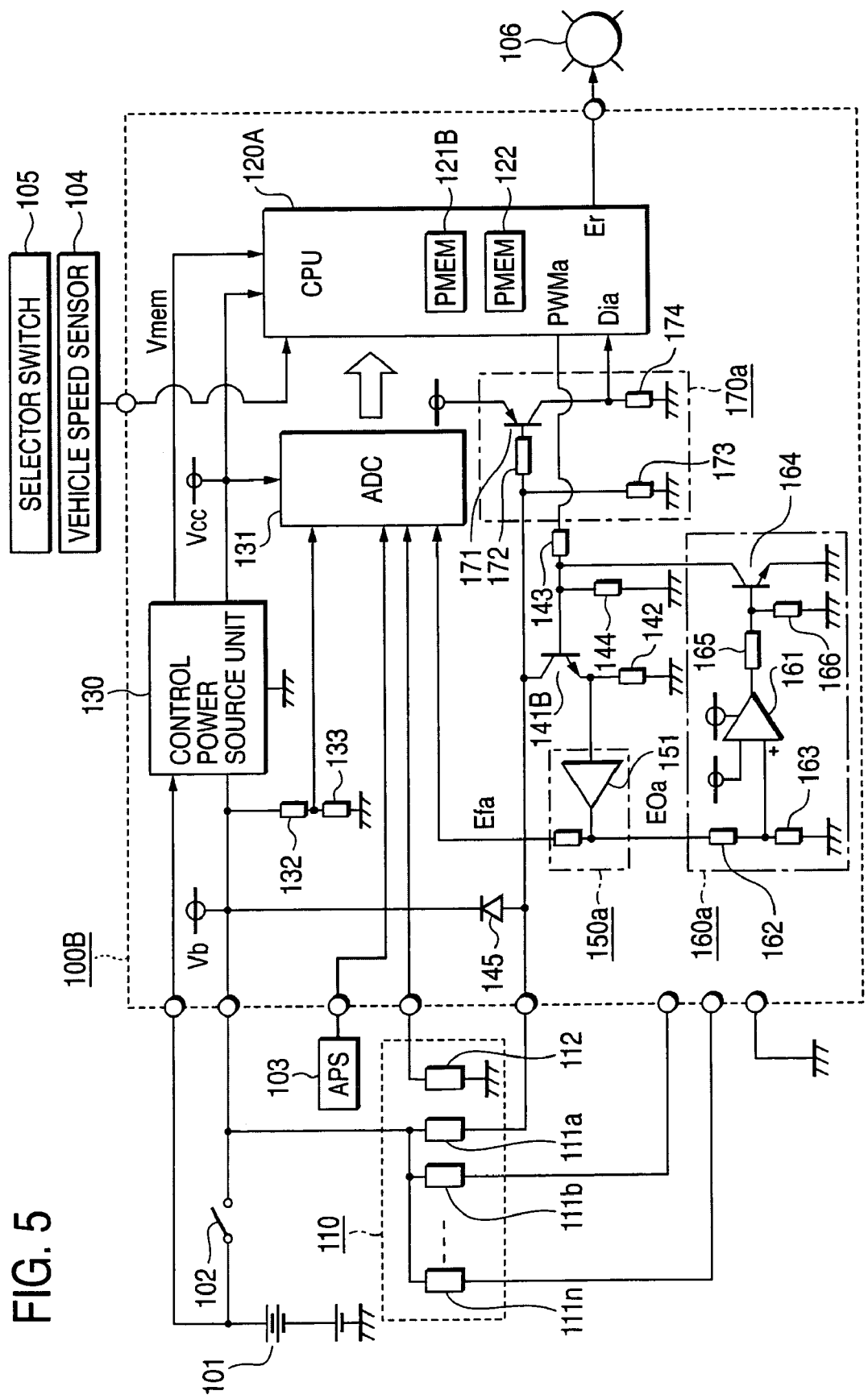
FIG. 5 is a block diagram showing the construction of a non-feedback type load current controller according to a second embodiment.

FIG. 5 shows the construction of a non-feedback type load current controller according to a second embodiment of the present invention.

In FIG. 5, reference numeral 100B represents the non-feedback type load current controller according to the second embodiment, and as in the case of the first embodiment, the non-feedback type load current controller 100B according to the second embodiment is externally connected to a driving power source 101, a power source switch 102, an acceleration position sensor 103, a vehicle speed sensor 104, a selector switch 105, a temperature sensor 112 of a multistage automatic transmission 110, electrical loads 111a, 111b, . . . , 111n as electromagnetic solenoids, and an alarm display unit 106.

The difference of the second embodiment from the non-feedback type load current controller 100A of the first embodiment shown in FIG. 1 will be mainly described.

In FIG. 5, as in the case of the first embodiment, as the internal construction of the non-feedback type load current controller 100B, the microprocessor (CPU) 120B cooperates with a non-volatile program memory 121B, and an NPN junction type transistor is used as an opening/closing element 141B in place of the electric field effect type transistor.

An over-current abnormality detecting circuit 160a is constructed by a comparison amplifier 161, voltage dividing resistors 162/163 to which a measurement voltage E0a as the output voltage of the current detecting amplifying circuit portion 150a is applied, a base resistor 165 for driving the NPN type transistor 164, and a stable resistor 166 connected between the base and emitter terminals of the transistor 164. A control power source voltage Vcc is applied to the inverting input terminal of the comparison amplifier 161, and a voltage divided by the voltage-dividing resistors 162/163 is applied to the non-inverting input terminal of the comparison amplifier 161, and the base resistor 165 for driving the transistor 164 is connected to the output terminal of the comparison amplifier 161.

The construction of the current detecting amplifying circuit portion 150a shown in FIG. 5 is the same as the current detecting amplifying circuit portion 150a shown in FIG. 1, and it is illustrated in a simplified style.

The collector terminal of the transistor 164 is connected to the base terminal of the opening/closing element 141B. When the value of the measurement voltage E0a is excessively large, the transistor 164 is conducted and the opening/closing element 141B is non-conducted.

A breaking abnormality detecting circuit 170a is constructed by a PNP type transistor 171 constituting a level converting circuit, a base resistor 172 connected between the base terminal of the transistor 171 and the collector terminal of the opening/closing element 141B, a leakage resistor 173 and a collector resistor 174 connected to the collector terminal of the transistor 171.

The leakage resistor 173 is connected between the ground circuit and the connection point between the negative-side terminal of the electrical load 111a and the collector terminal of the opening/closing element 141A, and weak leakage current flows from the driving power source 101 through the power source switch 102 and the electrical load 111a when the opening/closing element 141B is opened.

The control power source voltage Vcc is applied to the emitter terminal of the transistor 171, and the voltage at the collector terminal is input to the microprocessor 120B as a judgment logic signal Dia.

Accordingly, when the opening/closing element 141B is opened, the voltage applied to the leakage resistor 173 is substantially equal to the driving power source voltage Vb to set the transistor 171 to the open circuit condition, so that the logic level of the judgment logic signal Dia is set to "L". However, even when the opening/closing element 141B is opened, if the wire breaking of the electrical load 111a or the power supply line to the electrical load 111a occurs, no leakage current would flow in the leakage resistor 173, so that the base current of the transistor 171 is supplied through the in-series circuit of the base resistor 172 and the leakage resistor 173 to conduct the transistor 171 and thus the logic level of the judgment logic signal Dia is set to "H".

When the opening/closing element 141B is closed, the base current of the transistor 171 is supplied through the in-series circuit of the base resistor 172, the opening/closing element 141B and the current detecting resistor 142, and the transistor 171 is conducted, so that the logic level of the judgment logic signal Dia is set to "H". However, this state does not detect the wire breaking state of the electrical load 111a.

Next, The difference of the block diagram (FIG. 6) showing the operation of the non-feedback type load current controller according to this embodiment shown in FIG. 5 from the block diagram (FIG. 2) showing the operation of the non-feedback type load current controller according to the first embodiment will be mainly described.

Figure 6:
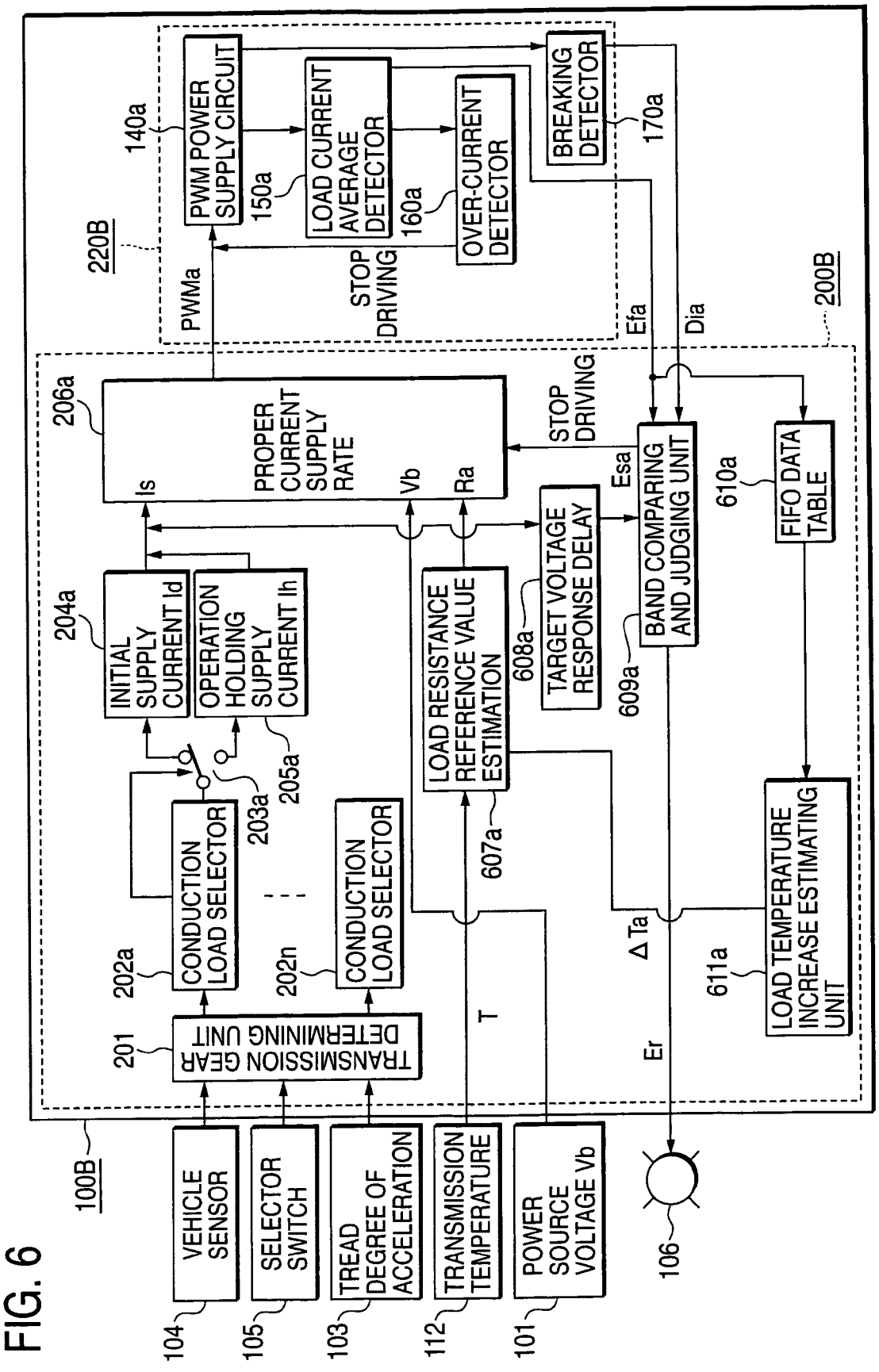
FIG. 6 is a block diagram showing the operation of the non-feedback type load current controller according to the second embodiment.

In FIG. 6, the non-feedback type load current controller 100B is divided into a power supply control circuit portion 200B mainly containing a microprocessor 120B, and a power supply driving circuit portion 200B mainly containing PWM power supply circuits 140a to 140n.

The power supply driving circuit portion 220B further contains current detecting amplifying circuit portions 150a to 150n, over-current detecting circuits 160a to 160n and wire breaking abnormality detecting circuits 170a to 170n. The current detecting amplifying circuit portions 150a to 150n generate monitoring voltages Efa to Efn, and the wire breaking abnormality detecting circuits 170a to 170n generate logic judgment signals Dia to Din.

The power supply control circuit portion 200B for generating opening/closing instructing outputs PWMa to PWMn is mainly constructed by a shift gear determining unit 201, corrected current supply rate calculating units 606a to 606n, comparison target voltage setting units 608a to 608n, band comparison judging units 609a to 609n, etc.

The shift gear determining unit 201 determines a proper shift gear in the same manner as shown in FIG. 2, and one of the instruction memories 202a to 202n which corresponds to a selected solenoid to be supplied with current and operated is selected from the electrical loads 111a to 111n corresponding to the electromagnetic solenoids.

Just after the instruction memory 202a is activated, the driving initial current setting unit 204a is selected through the current supply switching unit 203a, and the selected position of the current supply switching unit 203a is switched in a predetermined time to select the operation holding current setting unit 205a.

During the current non-supply period to the electrical load 111a, the supply target current Is is equal to zero, and the value of the supply target current Is (0, Ih, Id), the value of the driving power source voltage Vb and the value of the load resistance Ra of the electrical load 111a are input to the corrected current supply rate calculating unit 606a.

The load resistance Ra of the electrical load 111a is calculated from the equation (3) by the load resistance estimating unit 607a.

$$Ra = K1 + K2 \times T + K3 \times \Delta Ta \quad (3)$$

K1, K2, K3=constants

T represents the environmental temperature of the electrical loads 111a to 111n detected by the temperature sensor 112, and in the case of the automatic transmission, an oil temperature sensor for detecting the temperature of lubricating oil is used.

ΔTa represents the temperature increase value of the electrical load 111a determined by the past record of the supply current to the electrical load 111a and the thermal time constant of the electrical load.

The corrected current supply rate calculating unit 606a calculates the corrected current supply rate β from the equation (4) on the basis of the present values of the supply target current Is, the driving power source voltage Vb and the load resistance Ra.

$$\beta = Is \times Ra / Vb \quad (4)$$

Upon input of the voltage proportional to the supply current target current Is to the electrical load 111a, the comparison target voltage setting unit 608a operates, and generates the comparison target voltage Esa having the response delay corresponding to the smoothening time constant of the smoothening capacitor 153/157 in the current detecting amplifying circuit portion 150a. The smoothening time constant of the smoothening capacitor 153/157 corresponds to the current time constant which is the ratio between the inductance and resistance value of the electrical load 111a.

The band comparison judging unit 609a compares the comparison target voltage Esa achieved from the comparison target voltage setting unit 608a with the monitoring voltage Efa achieved from the current detecting amplifying circuit portion 150a. When the comparison result indicates a deviation, it generates the abnormality notification instructing output Er to actuate the alarm display unit 106, or when the comparison result indicates a critical deviation or the logic level of the judgment logic signal Dia during the non-conduction period of the opening/closing element 141B is set to "H", it acts on the corrected current supply rate calculating unit 606a to set the current supply rate α to zero.

The load temperature increase estimating unit 611a is constructed by a calculating unit for storing the square value of the monitoring voltage Efa to the electrical load 111a into the first-in first-out data table 610a for periodically storing data over at least a period not less than the thermal time constant of the electrical load 111a, calculating the moving average value concerning plural data thus stored and then multiplying the calculation result by a temperature conversion coefficient. It estimates the present temperature increase value ΔTa added with the thermal time constant of the electrical load.

The data to be stored in the first-in first-out data table 610a may be the square value of the set voltage corresponding to the supply target current Is to the electrical load 111a or the comparison target set voltage Esa in place of the monitoring voltage Efa.

The same processing is carried out when the operation of each of the electrical loads 111b to 111n is carried out, that is, the opening/closing instructing output PWMb to PWMn is generated, and the corresponding monitoring voltage Efb to Efn is achieved to carry out the abnormality judgment on each of the electrical loads 111b to 111n.

Figure 7:
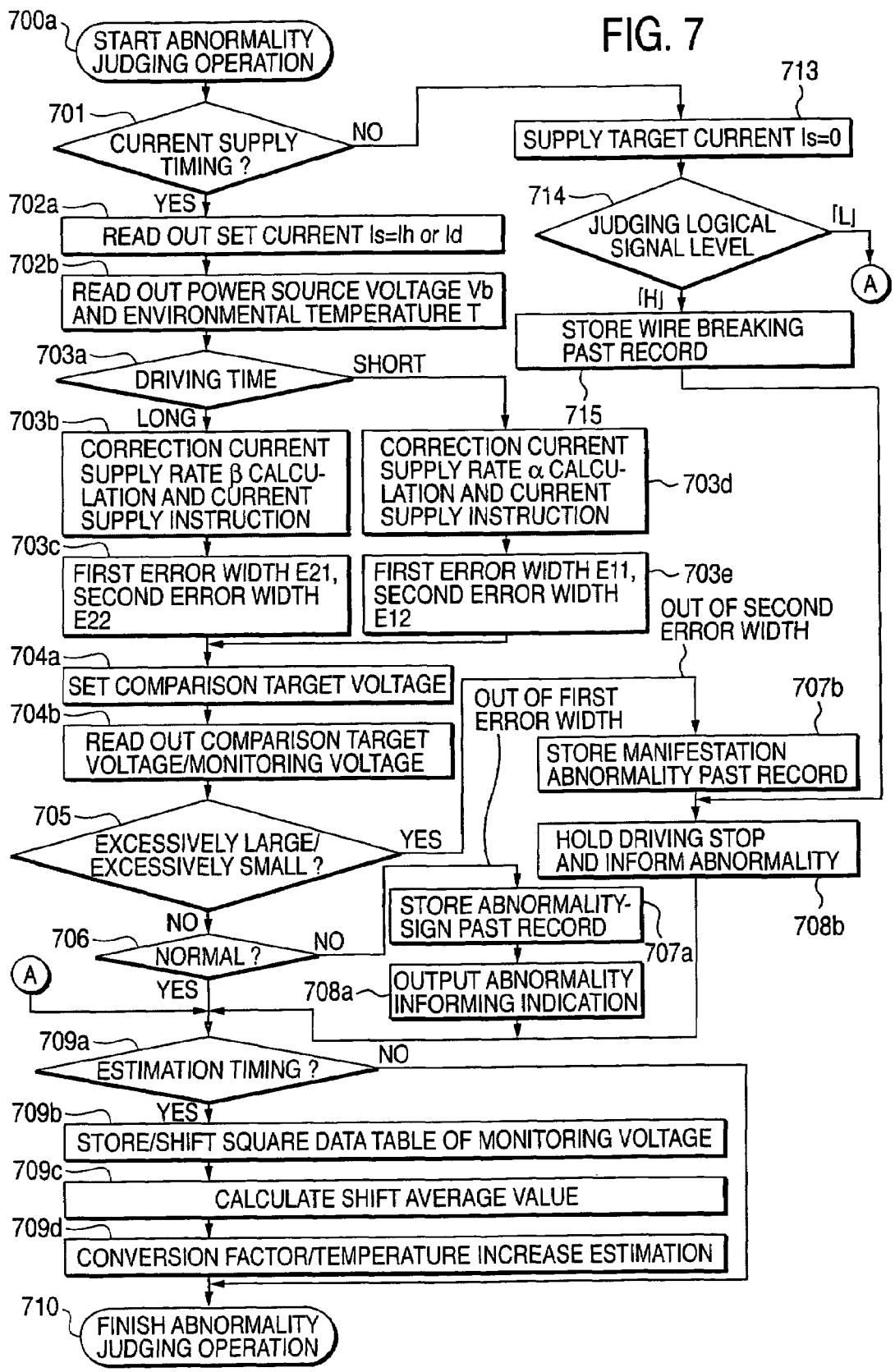
FIG. 7 is a flowchart showing the operation of the non-feedback type load current controller according to the second embodiment.

The corrected current supply rate calculating unit 606a corresponds to step 703B of FIG. 7, the comparison target voltage setting unit 608a corresponds to step 704a of FIG. 7, the band comparison judging unit 609a corresponds to steps 705/706 of FIG. 7, and the load temperature increase estimating unit 611a corresponds to step 709d of FIG. 7.

Next, the abnormality judging operation of the non-feedback type load current controller according to the second embodiment of the present invention shown in FIG. 5 will be described with reference to the flowchart of FIG. 7.

In FIG. 7, step 700a is a judging step of starting the abnormality detecting operation on the electrical load 111a by the microprocessor 120B, the subsequent step 701 is a step of judging whether a current supply timing to the electrical load 111a has come. If the current supply timing has come, the step shifts to step 702a, and if not so, the step shifts to step 713.

In the judgment of the step 701, the judgment as to the timing of the current supply is made by judging whether current supply instructing information is stored in the instruction memory 202a of FIG. 6.

Step 702a is a step of setting as the supply target current Is the driving initial current Id or the operation holding current Ih set by the driving initial current setting unit 204a or the operation holding current setting unit 205a in accordance with the operation position of the current supply switching unit 203a of FIG. 6 and reading the supply target current Is thus set, and the subsequent step 702b is a step of reading out the driving power source voltage Vb and the environmental temperature T input to the multichannel AD converter 131.

The subsequent step 703a is a judging step serving as the selection switching unit for judging whether a predetermined time elapses after the operation is started. If a long time elapses, the step shifts to step 703b, and if a short time elapses, the step shifts to step 703d. The judgment of the operation time in step 703a is made by judging whether data of a predetermined score or more are stored in the first-in first-out data table in step 709c described later.

The step 703b is a step serving as the corrected current supply rate calculating unit for calculating a corrected current supply rate adapted to the present temperature by the equations (3) and (4) based on the current supply temperature increase ΔTa of the electrical load 111a calculated by the subsequent step 709d, and generating the opening/closing instructing output PWMa to the opening/closing element 141B on the basis of the current supply rate thus calculated.

The subsequent step 703c selects E21 (for example, ±10%) as the first permissible error width for judging the abnormality sign described above with reference to FIG. 4, and selects E22 (for example, ±20%) as the second permissible error width for judging the appearing abnormality.

Step 703d is executed when the current supply temperature increase of the electrical load 111a in the subsequent step 709d has not yet been determined, and it is a step serving as the proper current supply rate calculating unit for calculating the proper current supply rate α on the basis of the equations (1) and (2), and generating the opening/closing instructing output PWMa to the opening/closing element 141B on the basis of the current supply rate thus calculated.

The subsequent step 703e is a step serving as the permissible error width correcting unit for selecting E11 (for example, ±30%) as the first permissible error width for judging the abnormality sign described above with reference to FIG. 4, and selecting E12 (for example, ±40%) as the second permissible error width for judging the appearing abnormality.

The proper current supply rate α calculated in step 703*d* is calculated from the equations (1) and (2) on the basis of the assumed temperature increase value according to any one of the initial temperature system adopting ΔTa=0, the maximum temperature system adopting ΔTa=ΔTa max or the average temperature system adopting ΔTa=ΔTa max/2 with neglecting variation of the current supply temperature increase ΔTa of the electrical load 111*a*.

Accordingly, since the monitoring voltage Efa is varied in accordance with the value of the actual current supply temperature increase ΔTa, the permissible error width of the step 703*e* is larger than the permissible error width of the step 703*c*, and thus the abnormality judgment can be prevented from being made needlessly.

The step 703*c* or the step 704*a* executed subsequently to the step 703*e* is a step serving as the comparison target voltage setting unit that operates upon input of the voltage proportional to the supply target current Is read out in step 702*a*, and generates a comparison target voltage Es having the response delay corresponding to the smoothening time constant of the smoothening capacitor 153/157 in the current detecting amplifying circuit portion 150*a*. The smoothening time constant of the smoothening capacitor 153/157 corresponds to the current time constant which is the ration between the inductance and resistance value of the electrical load 111*a*.

The subsequent step 704*b* is a step of reading out the present value of the comparison target voltage Esa calculated in step 704*a* and the present vale of the monitoring voltage Efa, and the subsequent step 705 is a step serving as the appearing abnormality detecting unit for judging whether the relative error between the comparison target voltage Esa and the monitoring voltage Efa read out in step 704*b* is in an excessively large current state or excessively small current state where the relative error is out of the second permissible error width E22 or E12 selected in step 703*c* or 703*e*. If the judgment of the step 705 is the judgment of the excessively large/excessively small abnormality, the step shifts to step 707*b* to preserve the appearing abnormality past record into the RAM memory 122, and then the step shifts to step 708*b*.

Step 708*b* is a step serving as the driving stop unit for turning on and off the alarm display unit 106 by intermitting the abnormality notification instructing output Er, and also generating the driving stop instruction to set the current supply rate in the step 703*b* or step 703*d*.

When the step 708*b* generates the driving stop instruction, this state is stored, and no opening/closing instructing output PWMa is generated for the period from the driving stop until the re-start.

When the judgment of the step 705 is not the judgment of the excessively large/excessively small abnormality, the step shifts to step 706. The step 706 is a step serving as the abnormality sign detecting unit for judging whether the relative error between the comparison target voltage Esa and the monitoring voltage Efa read out in step 704*b* is in the normal state where the relative error concerned is within the first permissible error width E21 or E11 selected in step 703*c* or 703*e* or in the abnormal sign occurring state where the relative error concerned is out of the first permissible error width E21 or E11. When the judgment of the step 706 is the judgment that there is some abnormality sign, the step shifts to step 707*a* to preserve the abnormality sign past record into the RAM memory 122, and then the step shifts to step 708*a*.

The step 708*a* is a step serving as the abnormality notification instructing output unit for generating the abnormality notification instructing output Er and turning on the alarm display unit 106.

When the judgment of the step 706 is a normality judgment or the judgment of step 714 described later indicates that there is no wire breaking abnormality, or the step 709*a* executed subsequently to the steps 708*a/*708*b* is a step of judging whether the timing for executing the subsequent steps 709*b* to 709*d* has come or not. For example, the judgment of Yes is carried out substantially periodically at a period τ such as once per ten seconds, for example.

The step 709*b* executed when the judgment of the step 709*a* is YES is a step of storing and preserving the representative value such as the average value of the square value of the monitoring voltage Efa in the previous period τ, simply the square value of the simple average value or the like into the first-in first-out data table, and also carrying out the moving shift operation of the first-in first-out data table to delete the head data. When the thermal time constant τa of the electrical load is equal to 500 seconds, for example, the first-in first-out data table moves and preserves one hundred data at an interval of period τ=10 seconds, and the current supply past record information is preserved over the double time of the thermal time constant τa.

The data to be stored in the first-in first-out data table are preferably the square representative value of the monitoring voltage Efa, however, in place of the monitoring voltage Efa, the value of the target voltage proportional to the supply target current or the square representative value of the comparison target voltage may be used.

The subsequent step 709*c* is a step of calculating the moving average value of many square data stored in step 709*b*, and the subsequent step 709*d* is a step serving as the load temperature increase estimating unit for estimating the present current supply temperature increase value ΔTa by multiplying the moving average value calculated in step 709*c* by the temperature conversion coefficient.

When the judgment of the step 709*a* is NO, the step 710 shifted subsequently to the step 709*d* is an end waiting step of the abnormality judging operation. In step 710, the microprocessor 120B carries out the abnormality judgment on the other electrical loads 111*b* to 111*n*, and after the calculation processing of the shift gear shown in the shift gear determining unit 201 of FIG. 6 is executed, an initializing step 700*a* is activated again.

Step 713 executed when the judgment of the step 701 is No and the current supply timing to the electrical load 111*a* has not yet come is a step of setting the supply target current Is to zero, and the subsequent step 714 is a step serving as the wire breaking abnormality judging unit. If the logic level of the judgment logic signal Dia is "H", it is judged that there is some wire breaking abnormality and the step shifts to step 715. If the logic level is "L", it is judged that there is no wire breaking abnormality, and the step shifts to step 709*a*.

In step 715, the wire breaking past record is preserved in the RAM memory 122 and then the step shifts to step 708*b*.

The abnormality past record information preserved in step 707*a/*707*b* and step 715 is read out and displayed through an external tool (not shown) serially connected to the microprocessor 120B in the maintenance and check work to provide the maintenance and check information such as the number of an electrical load in which abnormality occurs, the classification as to abnormality sign and appearing abnormality, the classification as to "excess or less" of the permissible error width, the presence or absence of wire breaking abnormality, etc. It is reset in connection with the end of the maintenance and check work.

The RAM memory 122 in which the abnormality past record information is stored is held under an electric power failure by the backup voltage Vmem generated by the control power source unit 130 even when the power source switch 102 is set to the open circuit condition. However, in order to adapt to detachment of the driving power source 101 or reduction of the abnormal voltage, the abnormality past record information may be timely transferred and evacuated into a non-volatile memory (not shown).

As is apparent from the foregoing description, the non-feedback type load current controller according to the second embodiment of the present invention is equipped with the power supply driving circuit portion 220B constructed by the in-series circuit of the driving power source 101, the inductive electrical load 111a and the opening/closing element 141B, and the power supply control circuit portion 200B for controlling the current supply rate α corresponding to the ration between the current supply term and the current supply period of the opening/closing element 141B in response to the values of the supply target current Is to the electrical load 111a and the driving power source voltage Vb, wherein the power supply driving circuit portion 220B is further equipped with a current detecting resistor 142 connected between the opening/closing element 141B and the ground circuit of the driving power source 101, an operational amplifier 151 for amplifying the voltage between both the ends of the current detecting resistor 142, a current detecting amplifying circuit portion 150a provided with a smoothening capacitor that is provided to at least one of an input circuit and an output circuit of the operational amplifier 151 and achieves a measurement voltage substantially proportional to the average value of the voltage between both the ends of the current detecting resistor 142, and a commutating circuit 145 that is connected to the electrical load 111a in parallel so that load current supplied when the opening/closing element 141B is closed feeds back and attenuates when the opening/closing element 141B is opened, thereby smoothening the load current.

The power supply control circuit portion 200B is equipped with a microprocessor 120B supplied with power from a control power source unit 130 that is supplied with power from the driving power source 101 and generates a stabilized control power source voltage Vcc lower than a driving power source voltage Vb, multichannel AD converters 131 to which plural analog signals are input, and a non-volatile program memory 121B that cooperates with the microprocessor 120B, stores a load current control program and contains a program serving as a abnormality sign detecting unit 706.

The current detecting amplifying circuit portion 150a is equipped with an operational amplifier 151 for amplifying the voltage between both the ends of the current detecting resistor 142, and smoothening capacitors 153/157 that are provided at least one of an input circuit and an output circuit of the operational amplifier 151 and achieves a measurement voltage E0 substantially proportional to the average value of the voltage between both the ends of the current detecting resistor 142, and the output of the operational amplifier 151 is input to the microprocessor 120B through the multichannel AD converter 131 as a monitoring voltage Ef limited to the control power source voltage Vcc or less.

Furthermore, the abnormality sign detecting unit 706 generates the abnormality notification instructing output Er when the relative error between the comparison target voltage Es corresponding to the supply target current Is and the monitoring voltage Ef is out of the first permissible error width E11/E21 in which the relative error is slightly deviated from a normal value range, and the measurement voltage E0 when the abnormality sign detecting unit 706 carries out abnormality detection is set to a value less than the control power source voltage Vcc.

Accordingly, during the transit period from occurrence of the short-circuit accident of the electrical load or the high-level short-circuit accident in which the negative-side wire and the positive-side power source line are mix-touched with each other until urgent interruption of the opening/closing element, the current detecting resistor serves as a current limiting resistor, so that an excessively large stress applied to the opening/closing element can be reduced.

With respect to the variation of the resistance value in connection with the semi-breaking/semi-short-circuit abnormality of the electrical load, the applied voltage is automatically adjusted so as to achieve target current in the case of the feedback control system. However, in the case of the non-feedback type control system, since the detected current is varied, an abnormality sign can be detected and thus abnormality can be notified by monitoring the output of the AD converter through the microprocessor.

The non-volatile program memory 121B further contains a program serving as a appearing abnormality detecting unit 705 and the driving stop unit 708b.

The appearing abnormality detecting unit 705 generates the abnormality notification instructing output Er under the excessively large current state or excessively small current state where the relative error between the comparison target voltage Es corresponding to the supply target current Is and the monitoring voltage Ef is out of the second permissible error width E12/E22 larger than the first permissible error width E11/E21.

When the appearing abnormality detecting unit 705 detects at least the excessively large current state, the driving stop unit 708b acts to set the opening/closing instructing output to the opening/closing element 141B to a full-opening instruction.

Accordingly, when an abnormality state notified as abnormality for maintenance and check at the occurrence time of the abnormality sign thereof further progresses, the driving of the electrical load is stopped by the appearing abnormality detecting unit to enhance the safety.

Furthermore, the operational amplifier 151 of the current detecting amplifying circuit portion 150a operates under application of the driving power source voltage Vb of the electrical load 111a as a power source voltage. The measurement voltage E0 as the output of the operational amplifier 151 is applied to the input terminal of the multichannel AD converter 131 as the monitoring voltage Ef through the current limiting resistor 156, and the voltage limiting diode 159 for limiting the monitoring voltage Ef to the control power source voltage Vcc level is connected to the input terminal of the multichannel AD converter 131. In addition, the power supply driving circuit portion 220B is further equipped with the over-current abnormality detecting circuit 160a.

The over-current abnormality detecting circuit 160a stops the current supply instruction to the opening/closing element 141B when the measurement voltage E0 further increases and exceeds a predetermined limiting threshold value Emax after the monitoring voltage Ef is limited to the control voltage Vcc by the voltage limiting diode 159.

Accordingly, the over-current abnormality detecting circuit 160a operates under the state that the output voltage of the operational amplifier 151 exceeds the control power source voltage Vcc, and thus the detection precision can be enhanced by setting the output voltage of the operational amplifier 151 under the detection state of the abnormality sign or appearing abnormality to as large a value as possible in the range below the control power source voltage Vcc. In addition, when over-current abnormality occurs, the opening/closing element 141B is quickly interrupted without relying on the microprocessor 120B, so that the burnout of the opening/closing element 141B can be prevented.

The power supply driving circuit portion 220B is further equipped with the wire breaking abnormality detecting circuit 170a, and also the non-volatile program memory 121B further contains a program serving as a wire breaking abnormality detecting unit 714.

The wire breaking abnormality detecting circuit 170a is constructed by a leakage resistor 173 supplied with minute current through the electrical load 111a when the opening/closing element 141B is under the open circuit condition, and a level converting circuit 171 for digitalizing the applied voltage level of the leakage resistor 173 and inputting the judgment logic signal Dia to the microprocessor 120B.

The wire breaking abnormality detecting unit 714 carries out a wire breaking abnormality judgment when no applied voltage to the leakage resistance occurs under the open circuit condition instructing state of the opening/closing element 141B, and generates at least abnormality notification instructing output Er.

Accordingly, even during the non-operating period of the opening/closing element, the wire breaking abnormality of the electrical load can be readily detected under the state that the electrical load is made not to operate effectively.

The non-volatile program memory 121B further contains a program serving as a proper current supply rate calculating unit 703d responding to the detection output of the temperature sensor 112 for detecting the environmental temperature of the electrical load 111a.

The proper current supply rate calculating unit 703d calculates the current supply rate $\alpha$ that is proportional to the target current Is to the electrical load 111a, inversely proportional to the driving power source voltage Vb and proportional to the load resistance Ra of the electrical load estimated from the environmental temperature T detected by the temperature sensor 112, and determines the ratio between the current supply instructing term and the current supply period of the opening/closing instructing output PWMa to the opening/closing element 141B.

Accordingly, even the non-feedback type load current control system can enhance the current control precision, so that the detection precision of the abnormality sign and the appearing abnormality can be enhanced.

The non-volatile program memory 121B further contains programs serving as a load temperature increase estimating unit 709d and a corrected current supply rate calculating unit 703e.

The load temperature increase estimating unit 709d estimates the temperature increase value $\Delta$Ta at the presents time of the electrical load 111a in association with the current supply past record to the electrical load 111a and the thermal time constant of the electrical load 111a, and adds the temperature increase value $\Delta$Ta thus estimated with the environmental temperature T detected by the temperature sensor 112 to calculate the present temperature of the electrical load 111a.

The corrected current supply rate calculating unit 703b increasingly or decreasingly corrects the value of the proper current supply rate calculated in the proper current supply rate calculating unit 703d in connection with increase or decrease of the load temperature increase estimated by the load temperature increase estimating unit 709d.

Accordingly, after the optimal current supply rate to the target current is calculated in consideration of the temperature increase of the electrical load in connection with the current supply load current, the environmental temperature and the driving power source voltage and the current control of the opening/closing element is carried out, the abnormality judgment is carried out, so that the detection precision of the abnormality sign or the appearing abnormality can be further enhanced.

The non-volatile program memory 121B further contains a program serving as a selection switching unit 703a and a permissible error width correcting unit 703e.

The selection switching unit 703a invalidates the corrected current supply rate calculating unit 703b during a predetermined period after the operation is started.

The permissible error width correcting unit 703e sets the permissible error width in the abnormality judging band comparison to a large value when the corrected current supply rate calculating unit 703b is invalidated, and corrects the permissible error width concerned so that the permissible error width concerned is narrowed after the corrected current supply rate calculating unit 703b is validated.

Accordingly, in such a case that the operation is resumed after an uncertain operation cease period, the abnormality judgment permissible error width can be prevented from being broadened to make an abnormality judgment needlessly until the temperature increase of the electrical load can be estimated.

Furthermore, the load temperature increase estimating unit 709d estimates the present temperature increase value added with the thermal time constant of the electrical load by the first-in first-out data table 610a for periodically storing the square representative value of the set voltage corresponding to the supply target current Is to the electrical load 111a or the monitoring voltage Efa over at least the period above the thermal time constant of the electrical load 111a and the calculating unit for calculating the moving average value concerning plural data stored in the data table 610a and multiplying the moving average value concerned by the temperature conversion coefficient. Accordingly, even when the load current is varied, the temperature increase of the electrical load caused by the supply load current can be estimated with relatively high precision by the simple calculating unit.

Furthermore, the non-volatile program memory 121B contains serving as a program serving as a comparison target voltage setting unit 704a.

The comparison target voltage setting unit 704a operates upon input of the voltage proportional to the supply target current Is to the electrical load 111a, and generates the comparison target voltage Es having the response delay corresponding to the smoothening time constant of the smoothening capacitors 153/157 in the current detecting amplifying circuit portion 150a. The smoothening time constant of the smoothening capacitors 153/157 corresponds to the value of the current time constant which is the ratio between the inductance and resistance value of the electrical load 111a.

Accordingly, the abnormality sign or the appearing abnormality can be detected with relatively high precision even during the transit period when the supply target current varies and thus the load current varies.

Furthermore, the electrical load is each of the plural electromagnetic-valve driving electromagnetic solenoids 111a, 111b, ..., 111n for switching the shift gears in the multistage automatic transmission 110 for the vehicle. The supply target current Is to the electromagnetic solenoids 111a, 111b, ..., 111n is varied in magnitude in accordance with the driving initial current Id and the operation holding current Ih, and the temperature sensor 112 for detecting the environmental temperature of the electromagnetic solenoids 111a, 111b, ..., 111n may be substituted by an oil temperature sensor for detecting the temperature of lubricating oil of the automatic transmission 110.

Accordingly, even the non-feedback control system can carry out the high-precision current control system by actively using an existing oil temperature sensor, and the control load imposed on the microprocessor for the many electromagnetic solenoids can be more greatly reduced as compared with the feedback type current control device to which high-speed response is required.

Other embodiments (modifications) of the above embodiments will be described hereunder.

The over-current abnormality detecting circuit 160*a* according to the first or second embodiment of the present invention acts to urgently interrupt the opening/closing element 141A/141B and prevent the burn out of the opening/closing element 141A/141B.

However, when the opening/closing element 141*a* or 141B is urgently interrupted, the measurement voltage E0*a* is reduced, and the output of the over-current abnormality detecting circuit 160*a* is set to "H", so that the opening/closing element 141A or 141B is restored to the conduction state.

If the short-circuit/high-level short-circuit state is still continued, the over-current abnormality detecting circuit 160*a* is actuated again, and the opening/closing element 141A or 141B is interrupted, so that the intermittent state of the opening/closing element 141A or 141B is continued.

When such abnormality as described above occurs, the driving stop unit 308*b* of FIG. 3 or the driving stop unit 708*b* of FIG. 7 finally acts to stop the opening/closing instructing output PWMa and thus the load current is equal to zero. Once the driving stopping unit 308*b* or the driving stop unit 708*b* is actuated, this state is stored and the driving stop state is continued until the operation is stopped and resumed.

However, if once the over-current abnormality detecting circuit 160*a* is actuated, this state is held by a flip-flop circuit and then the opening/closing element 141A or 141B is urgently interrupted, it is unnecessary to use both the driving stop units 308*b* and 708*b* at the same time.

Furthermore, if the wire breaking abnormality detecting circuit 170*a* is added as in the case of the second embodiment shown in FIG. 5, it is possible to delete the appearing abnormality detecting unit 705 shown in FIG. 7. In this case, the presence or absence of occurrence of appearing abnormality can be judged on the basis of the judging logic signal Dia according to the following manner.

First, in the case of wire breaking abnormality, if the logic level of the judging logic signal Dia is set to "H" during the non-operation instructing period (opening/closing instructing output PWMa="H") of the electrical load 111*a*, it would be judged that wire breaking abnormality appears.

Next, in the case of short-circuit/high-level short-circuit, if the logic level of the judging logic signal Dia is set to "L" during the driving instruction period (opening/closing instruction output PWMa="L") of the electrical load 111*a*, it would be judged that short-circuit/high level short-circuit appears.

When the appearing abnormality detecting unit 305 or 705 or the driving stop unit 308*b* or 708*b* is provided, the over-current abnormality detecting circuit 160*a* disposed in the double systems can be omitted. When the over-current abnormality detecting circuit 160*a* is omitted, the voltage limiting diode 159 can be omitted by setting the driving power source voltage of the operational amplifier 151 to the control power source voltage Vcc.

In this case, even when an over-current state occurs, the measurement voltage E0*a* itself does not increase to the value of the control power source voltage Vcc or more, and the detection precision can be enhanced by setting the output voltage of the operational amplifier 151 under the detection state of abnormality sign or appearing abnormality to as large a value as possible within the range below the control power source voltage Vcc.

In the step 304*a* of FIG. 3 or step 704*a* of FIG. 7, during the transit period when the comparison target voltage Esa varies increasingly or decreasingly, some deviation based on the error of the smoothening time constant may occur between the comparison target voltage Esa and the monitoring voltage Efa. Therefore, the first and second permissible error widths in the appearing abnormality detecting unit 305 or 705 or the abnormality sign detecting unit 306 or 706 can be prevented from being need lessly broadened to make an abnormality judgment until the comparison target voltage Esa is stabilized.

Furthermore, the judgment result of the appearing abnormality detecting unit 305 or 705 or the abnormality sign detecting unit 306 or 706 may be stored in a shift register, and the majority logic is applied to judgment results which are successively stored in the shift register, there by achieving a final judgment result. By adding such a digital filtering function as described above, a high-precision abnormality judgment can be performed while an erroneous judgment caused by pulsating components contained in the monitoring voltage Efa can be avoided.

The abnormality judgment by the appearing abnormality detecting unit 305/705 or the abnormality sign detecting unit 306/706 according to the first or second embodiment of the invention is executed at relatively high frequency at all times during operation of the controller. However, for example, the abnormality sign detecting unit 306/706, excluding the function of preventing burnout of short-circuit/high level short-circuit abnormality, may be executed at the start time of the operation of the controller or at a specific timing just before the operation is stopped or the like.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A load current controller comprising:
    a power supply driving circuit portion constructed by an in-series circuit comprising a driving power source, an inductive electrical load and an opening/closing element; and
    a power supply control circuit portion for controlling a pulse duty factor corresponding to a ratio between an ON pulse width and an ON/OFF period of the opening/closing element in response to the values of a predetermined supply target current and a driving power source voltage to be applied to the electrical load, wherein the power supply driving circuit portion comprises a current detecting resistor connected between the opening/closing element and a ground circuit of the driving power source, a current detecting amplifying circuit portion provided with an operational amplifier for amplifying the voltage between both the terminals of the current detecting resistor and a smoothening capacitor that is provided to at least one of an input circuit and an output circuit of the operational amplifier and achieves a measurement voltage substantially proportional to the average value of the voltage between both the terminals of the current detecting resistor, and a commutating circuit that is connected to the electrical load in parallel and subjects the load current supplied when the opening/closing element is under the close circuit condition to flow-back and attenuation when the opening/closing element is opened, and the power supply control circuit portion is equipped with a microprocessor supplied with power from a control power source unit that is supplied with power from the driving power source and generates a stabilized control power source voltage lower than the driving power source voltage, a multi-channel AD converter to which plural analog signals are input, and a non-volatile program memory that stores a load current control program in cooperation with the microprocessor and contains a program as an abnormality sign detecting unit, and wherein the output of the operational amplifier is input to the microprocessor through the multi-channel AD converter as a monitor voltage which is limited to a value not more than the control power source voltage, the abnormality sign detecting unit generates an abnormality notification instructing output when the relative error between the comparison target voltage corresponding to the predetermined supply target current and the monitor voltage is out of a band of a first permissible error width in which the relative error is slightly deviated from a normal value range, and the measurement voltage when the abnormality sign detecting unit carries out abnormality detection is set to a value less than the control power source voltage, wherein the pulse duty factor is determined based on the value of the predetermined supply target current, the value of the driving power source voltage, and an estimate value of electrical resistance of the electrical load, irrespective of an increase or decrease of the monitor voltage.

2. The load current controller according to claim 1, wherein the non-volatile program memory further comprises a program serving as an appearing abnormality detecting unit and a driving stop unit, and the appearing abnormality detecting unit generates a second abnormality notification instructing output under an excessively large current state or excessively small current state where the relative error between the comparison target voltage and the monitoring voltage is out of a band of a second permissible error width larger than the first permissible error width, and the driving stop unit acts to set an opening/closing instructing output to the opening/closing element to a full-open instruction when the appearing abnormality detecting unit detects at least the excessively large current state.

3. The load current controller according to claim 1, wherein the non-volatile program memory further comprises a program serving as a non-operation low current setting unit, and the non-operation low current setting unit sets, as the predetermined supply target current, a non-operation low current having a level at which the electrical load does not effectively operate, and temporarily supplies the non-operation low current for a predetermined short term in a time period during which the electrical load is not in use.

4. The load current controller according to claim 1, wherein the operational amplifier of the current detecting amplifying circuit portion operates under application of the driving power source voltage of the electrical load as a power source voltage, the measurement voltage corresponding to the output of the operational amplifier is applied to an input terminal of the multichannel AD converter as a monitoring voltage through a current limiting resistor, a voltage limiting diode for limiting the monitoring voltage to a control power source voltage level is connected to an input terminal of the multi-channel AD converter, the power supply driving circuit portion is further equipped with an over-current abnormality detecting circuit, and the over-current abnormality detecting circuit stops a current supply instruction to the opening/closing element when the measurement voltage further increases and exceeds a predetermined limiting threshold value after the monitoring voltage is limited to the control voltage level by the voltage limiting diode.

5. The load current controller according to claim 1, wherein the non-volatile program memory further comprises a program serving as a proper current supply rate calculating unit in response to the detection output of a temperature sensor for detecting the environmental temperature of the electrical load, and the proper current rate calculating unit calculates a the pulse duty factor that is proportional to the predetermined supply target current for the electrical load, inversely proportional to the driving power source voltage and proportional to the load resistance of the electrical load estimated from the environmental temperature detected by the temperature sensor, and determines an ON pulse width of an opening/closing instruction output to the opening/closing element based on a value of the pulse duty factor.

6. The load current controller according to claim 5, wherein the non-volatile program memory further comprises a program serving as a load temperature increase estimating unit and an abnormality judging and correcting unit, and wherein the load temperature increase estimating unit estimates a present temperature increase value of the electrical load in association with a current supply past record to the electrical load and the thermal time constant of the electrical load, and calculates a present temperature of the electrical load by adding the temperature increase value thus estimated with the environmental temperature detected by the temperature sensor, the proper current supply rate calculating unit determines the pulse duty factor that is proportional to the load resistance estimated from the environmental temperature of the electrical load irrespective of the temperature increase of the electrical load caused by the current supply load current, and the abnormality judging and correcting unit reduces, in response to the temperature increase value of the electrical load estimated by the load temperature increase estimating unit, the value of the comparison target voltage for which a comparison judgment is carried out by the abnormality sign detecting unit or the appearing abnormality detecting unit, or increased the value of the monitoring voltage.

7. The load current controller according to claim 6, wherein the non-volatile program memory further comprises a program serving as a selection switching unit and a permissible error width correcting unit, and wherein the selection switching unit invalidates the abnormality judging and correcting unit during a predetermined period after the operation is started, and the permissible error width correcting unit sets a permissible error width in the abnormality judgment comparison to a large value when the abnormality judging and correcting unit is invalid, and corrects the permissible error width so that the permissible error width concerned is narrowed after the abnormality judging and correcting unit is validated.

8. The load current controller according to claim 1, wherein the non-volatile program memory further comprises a program serving as a comparison target voltage setting unit, wherein the comparison target voltage setting unit operates upon input of a voltage proportional to the supply target current to the electrical load, and generates the comparison target voltage having a response delay corresponding to a smoothening time constant of the smoothening capacitor in the current detecting amplifying circuit portion, and the smoothening time constant of the smoothening capacitor corresponds to a current time constant that is a ratio between an inductance and a resistance value of the electrical load.

* * * * *